United States Patent
Uga et al.

(10) Patent No.: US 9,521,511 B2
(45) Date of Patent: Dec. 13, 2016

(54) RADIO COMMUNICATION SYSTEM, USER EQUIPMENT DEVICE, BASE STATION DEVICE, AND MANAGEMENT DEVICE

(71) Applicants: Shinsuke Uga, Chiyoda-ku (JP); Miho Maeda, Chiyoda-ku (JP); Mitsuru Mochizuki, Chiyoda-ku (JP)

(72) Inventors: Shinsuke Uga, Chiyoda-ku (JP); Miho Maeda, Chiyoda-ku (JP); Mitsuru Mochizuki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 183 days.

(21) Appl. No.: 14/348,387

(22) PCT Filed: Sep. 27, 2012

(86) PCT No.: PCT/JP2012/074900
§ 371 (c)(1),
(2) Date: Mar. 28, 2014

(87) PCT Pub. No.: WO2013/047664
PCT Pub. Date: Apr. 4, 2013

(65) Prior Publication Data
US 2014/0228057 A1    Aug. 14, 2014

(30) Foreign Application Priority Data
Sep. 30, 2011  (JP) .................. 2011-216040

(51) Int. Cl.
*H04W 4/02* (2009.01)
*H04W 64/00* (2009.01)
(Continued)

(52) U.S. Cl.
CPC .............. *H04W 4/02* (2013.01); *H04W 64/00* (2013.01); *H04B 7/15507* (2013.01);
(Continued)

(58) Field of Classification Search
CPC ...... H04W 4/02; H04W 64/00; H04W 64/003; H04W 84/005; H04W 84/047; H04B 84/047; H04B 7/15507
See application file for complete search history.

(56) References Cited

U.S. PATENT DOCUMENTS 7,340,278 B2    3/2008  Nakada
8,570,991 B2   10/2013  Shinozaki
(Continued)

FOREIGN PATENT DOCUMENTS

JP    2004-363886 A    12/2004
JP    2005 328152      11/2005
(Continued)

OTHER PUBLICATIONS

Partial Supplementary European Search Report issued Oct. 19, 2015 in Patent Application No. 12835558.3.
(Continued)

*Primary Examiner* — Barry Taylor
(74) *Attorney, Agent, or Firm* — Oblon, McClelland, Maier & Neustadt, L.L.P.

(57) ABSTRACT

A radio communication system capable of, in a case where a base station device is movable, easily estimating the location of a base station device and easily estimating the location of a user equipment device using the estimation results, and also provide a user equipment device, a base station device, and a management device included in the radio communication system. In addition to an E-SMLC for UE for use in location estimation of a target UE, an E-SMLC for eNB for use in location estimation of an eNB is provided. The E-SMLC for eNB estimates location information of an eNB in an E-UTRAN and performs a process, such as the management of moving of a target eNode B_s and a target eNode B_uu based on the estimated location information.

15 Claims, 25 Drawing Sheets

(51) Int. Cl.
  *H04B 7/155* (2006.01)
  *H04W 84/04* (2009.01)
  *H04W 84/00* (2009.01)
(52) U.S. Cl.
  CPC ........ *H04W 64/003* (2013.01); *H04W 84/005* (2013.01); *H04W 84/047* (2013.01)

(56) References Cited

U.S. PATENT DOCUMENTS

| | | | |
|---|---|---|---|
| 2003/0125046 | A1 | 7/2003 | Riley et al. |
| 2005/0255890 | A1 | 11/2005 | Nakada |
| 2008/0085699 | A1 | 4/2008 | Hirano et al. |
| 2008/0186871 | A1* | 8/2008 | Trevino .............. G01D 4/004 370/252 |
| 2008/0318596 | A1 | 12/2008 | Tenny |
| 2010/0323723 | A1 | 12/2010 | Gerstenberger et al. |
| 2010/0331013 | A1 | 12/2010 | Zhang |
| 2011/0207450 | A1* | 8/2011 | Siomina .............. G01S 5/0221 455/422.1 |
| 2011/0287734 | A1 | 11/2011 | Isobe et al. |
| 2012/0142313 | A1* | 6/2012 | Edge .................. H04W 64/003 455/410 |

FOREIGN PATENT DOCUMENTS

| | | |
|---|---|---|
| JP | 2009 225015 | 10/2009 |
| JP | 2010 114685 | 5/2010 |
| JP | 2010 219753 | 9/2010 |
| WO | WO 2010/147526 A1 | 12/2010 |
| WO | WO 2011/118577 | 9/2011 |

OTHER PUBLICATIONS

"3rd Generation Partnership Project; Technical Specification Group Radio Access Network; UTRAN architecture for 3G Home Node B (HNB); Stage 2 (Release 10)" 3GPP TS 25.467 V10.3.0, XP050553960, Sep. 2011, 59 Pages.
International Preliminary Report on Patentability and Written Opinion issued Apr. 10, 2014, in International application No. PCT/JP2012/074900 (with English translation).
3GPP TS 36.00 V10.3.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", LTE Advanced 3GPP, pp. 1-197, (Mar. 2011).
3GPP TSG-RAN WG3 #66bis R3-100342, "Positioning support with HeNBs", Qualcomm Incorporated, Total 3 Pages, (Jan. 18-22, 2010).
3GPP TSG RAN WG3 #71 R3-110729, "Discussion on UE Context Release Issue", ZTE, Total 1 Page, (Feb. 21-25, 2011).
3GPP TS 23.271 V10.2.0, "3rd Generation Partnership Project; Technical Specification Group Services and System Aspects; Functional stage 2 description of Location Services (LCS) (Release 10)" LTE Advanced 3GPP, pp. 1-169, (Mar. 2011).
3GPP TS36.305 V10.2.0, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 10)" pp. 1-51, (Jun. 2011).
3GPP TS 25.305 V10.0.0, "3rd Generation Partnership Project; Technical Specification Group Radio Access Network; Stage 2 functional specification of User Equipment (UE) positioning in UTRAN (Release 10)" pp. 1-80, (Sep. 2010).
International Search Report Issued Dec. 18, 2012 in PCT/JP12/074900 Filed Sep. 27, 2012.
Extended European Search Report issued on Feb. 19, 2016 in European Patent Application No. 12835558.3.
Japanese Office Action dated Oct. 18, 2016, issued in Japanese Patent Application No. 2013-536384 (with English translation).

* cited by examiner

FIG. 3
BACKGROUND ART
(A)
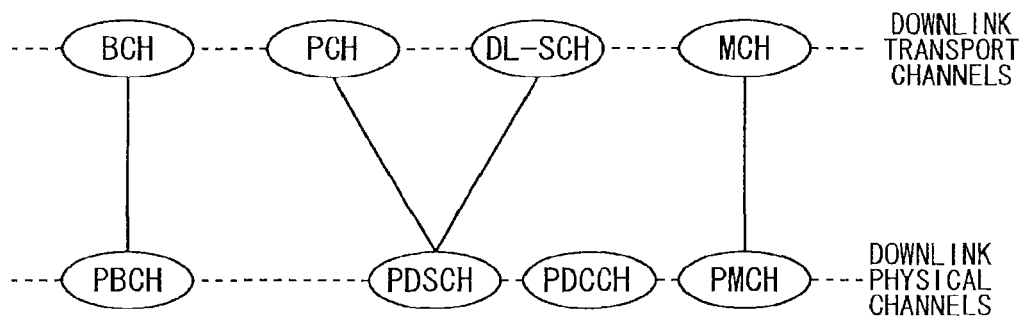
(B)
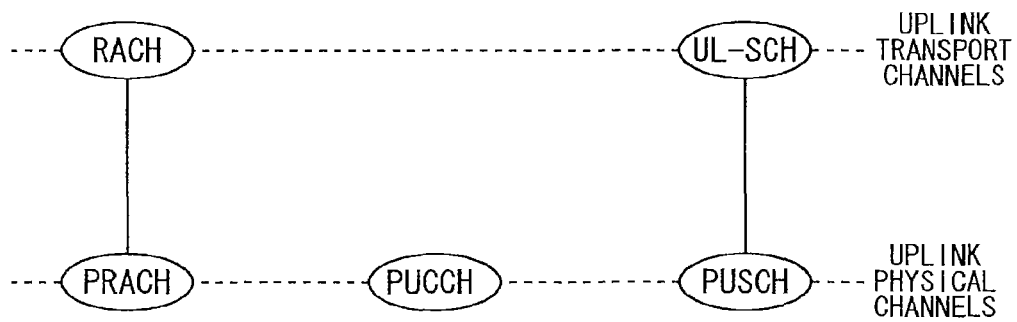

FIG. 4
BACKGROUND ART
(A)
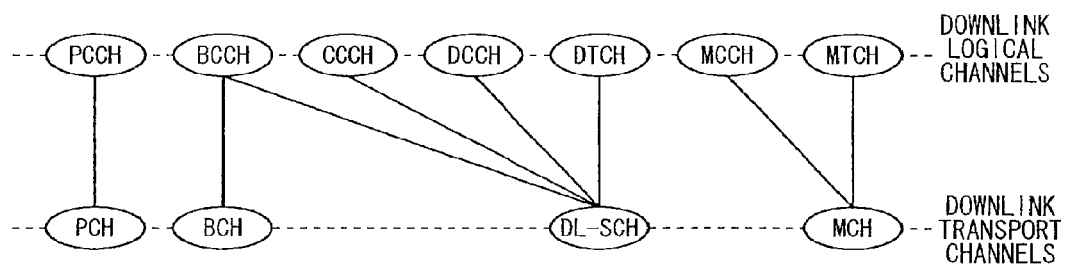
(B)
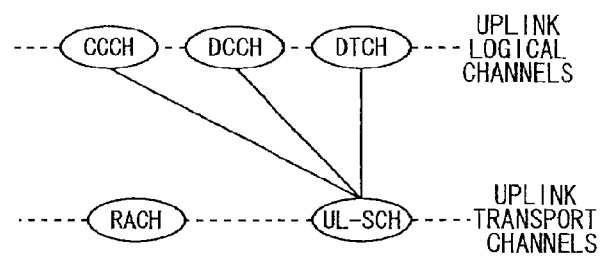

F I G . 7
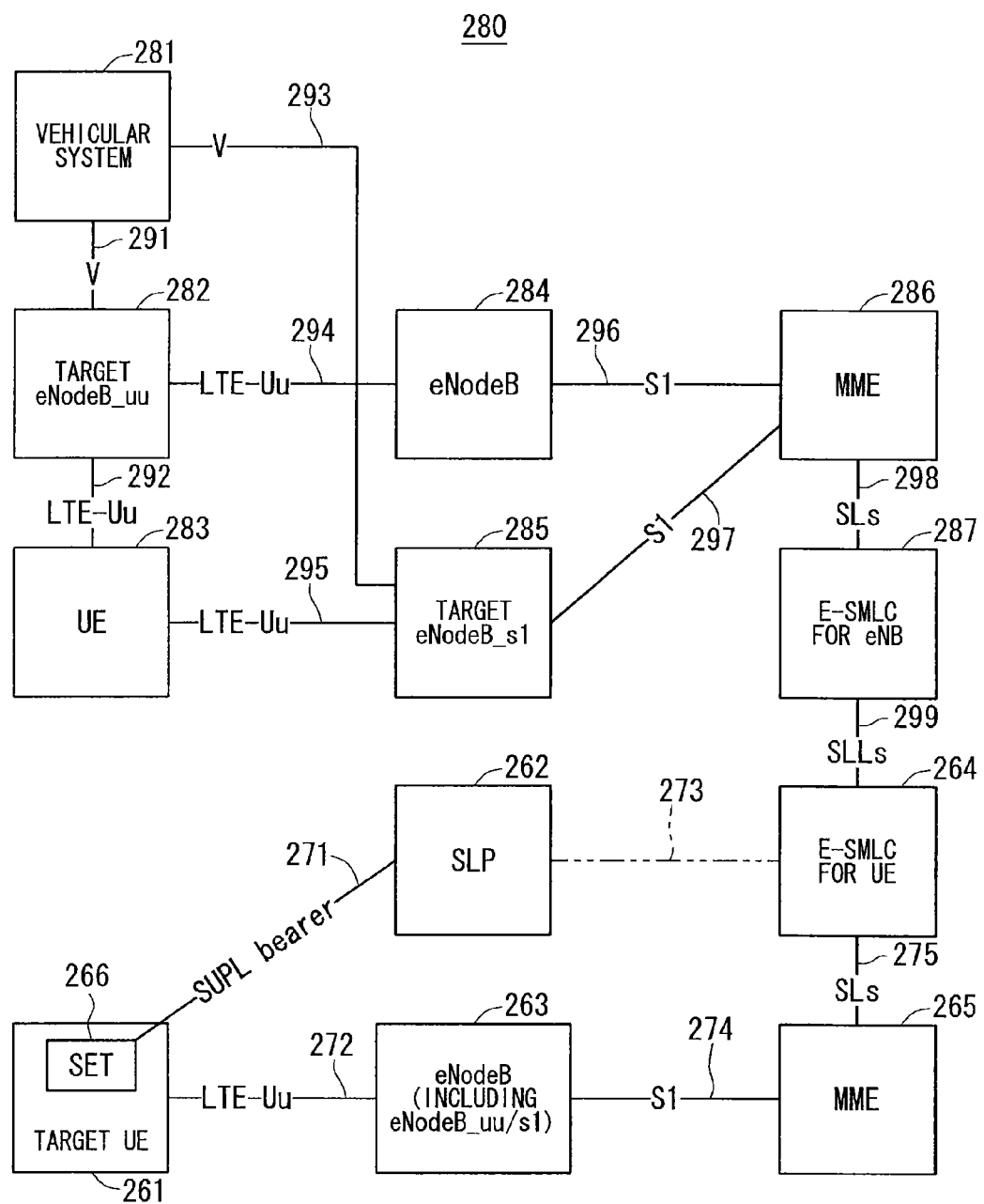

F I G. 1 2
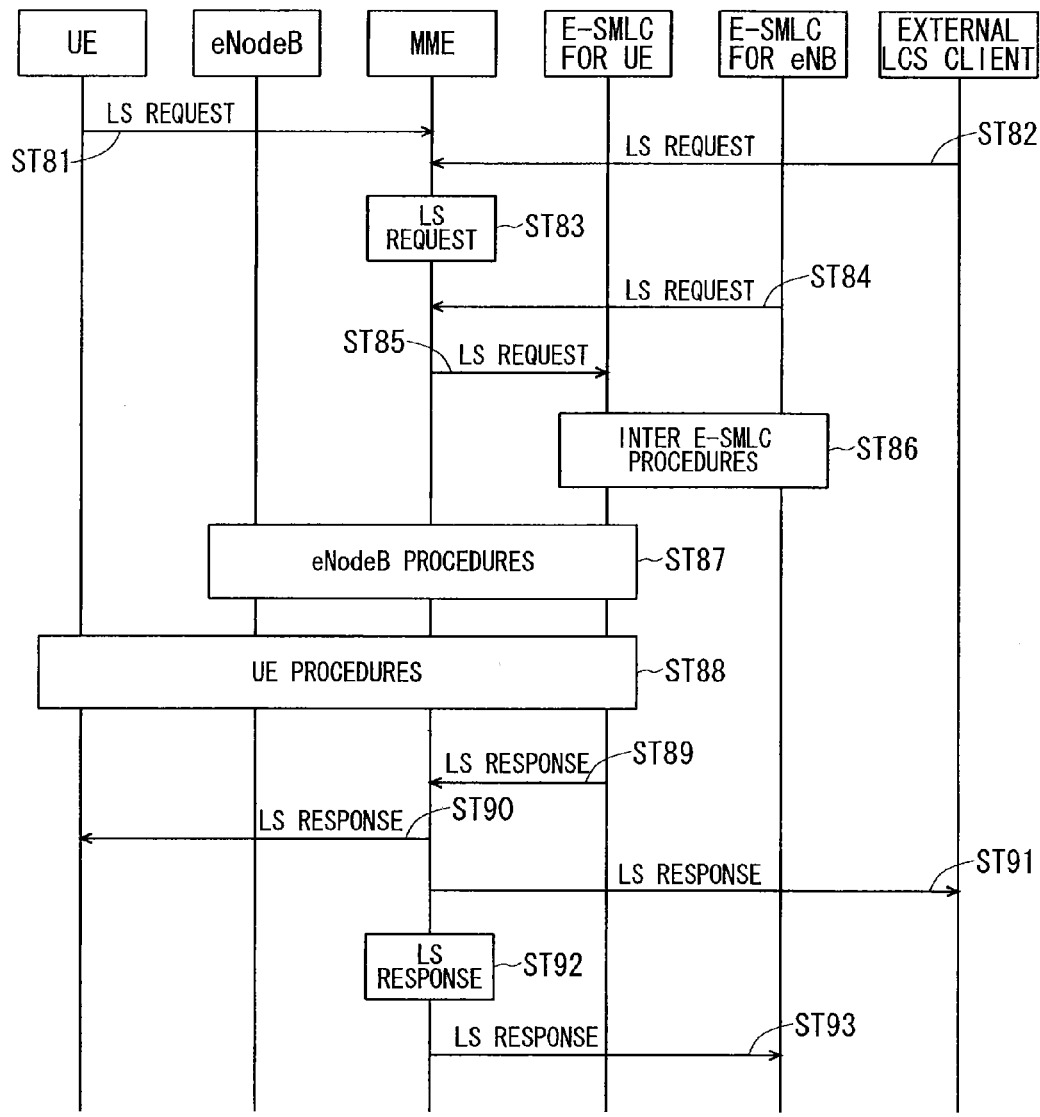

F I G . 1 4
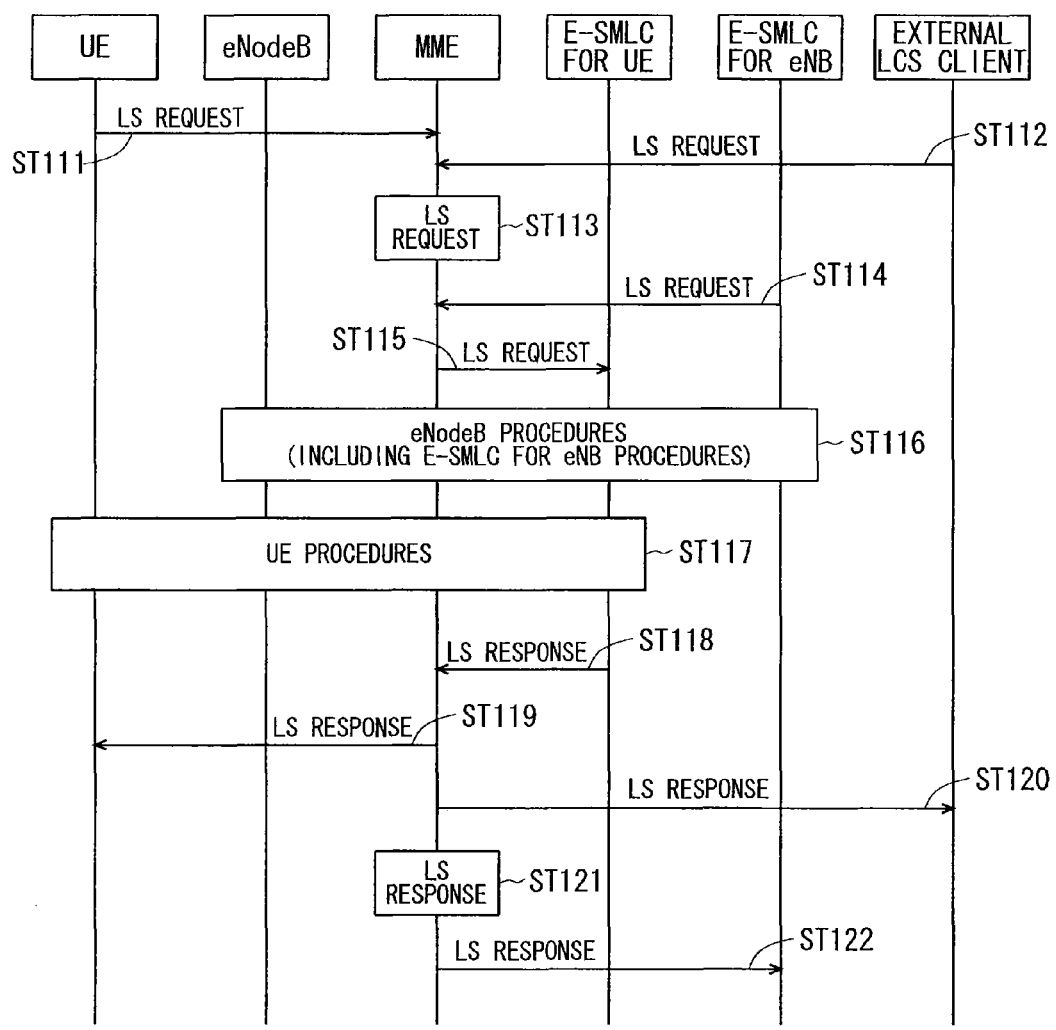

F I G. 1 5
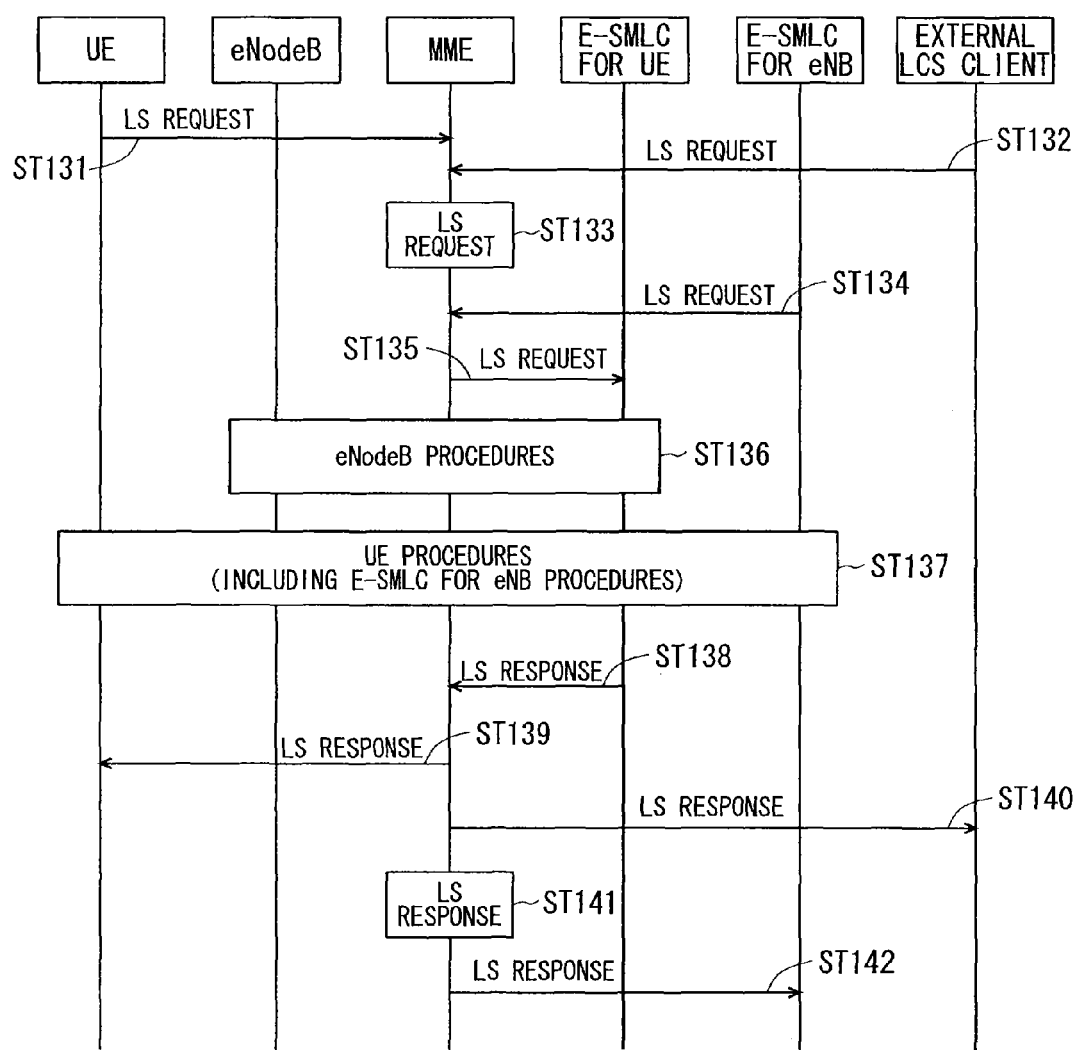

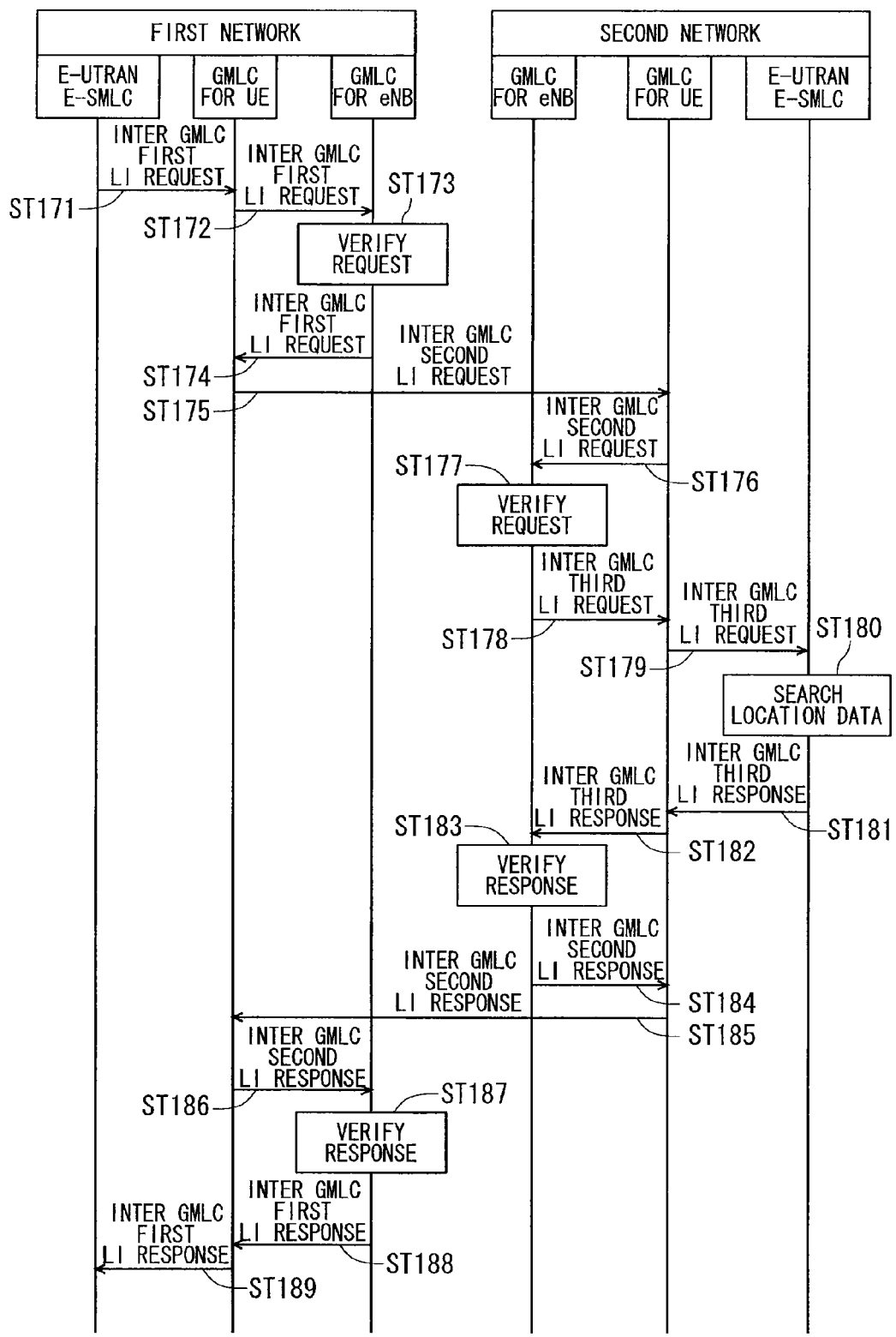

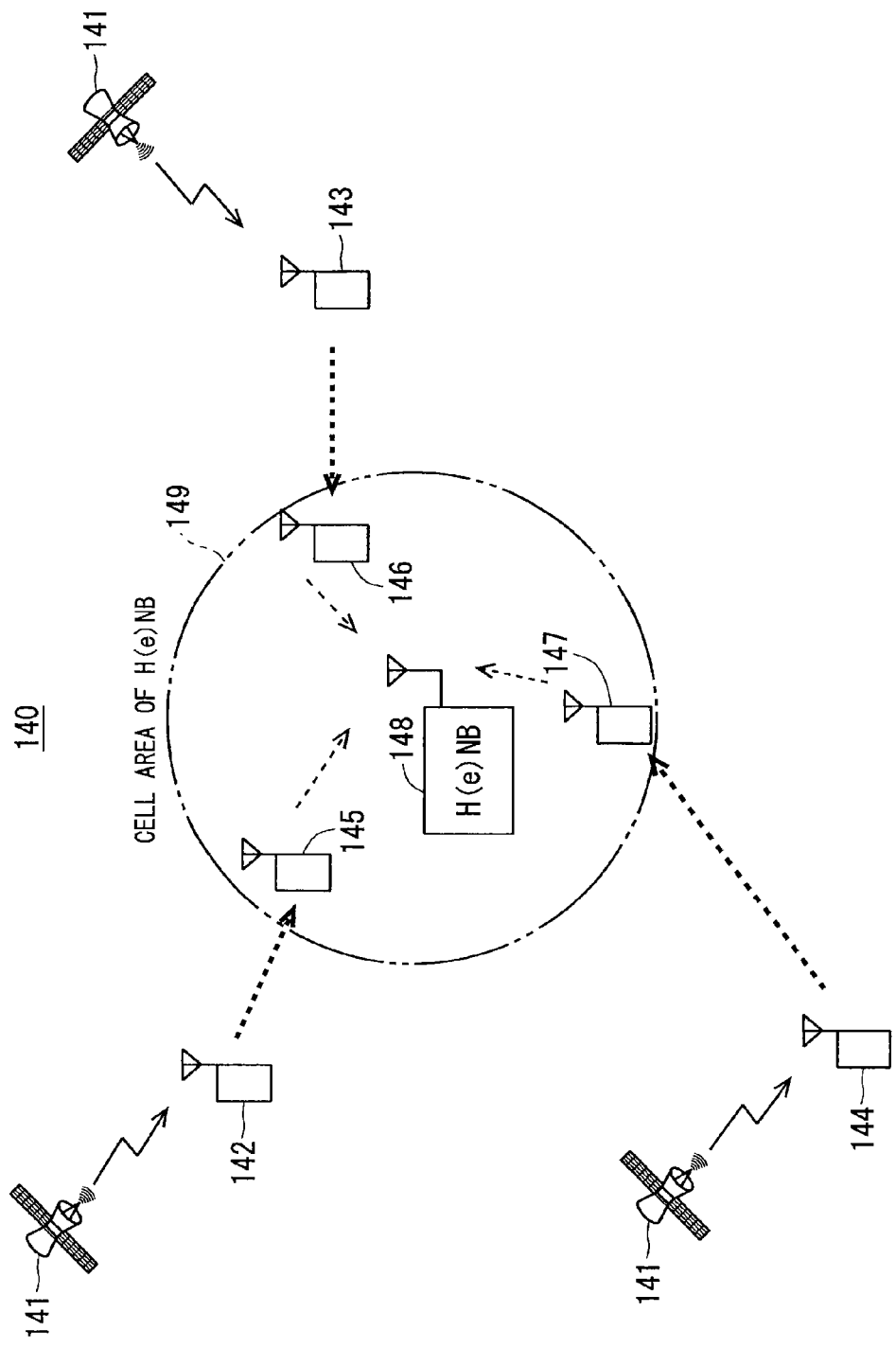

F I G . 2 6
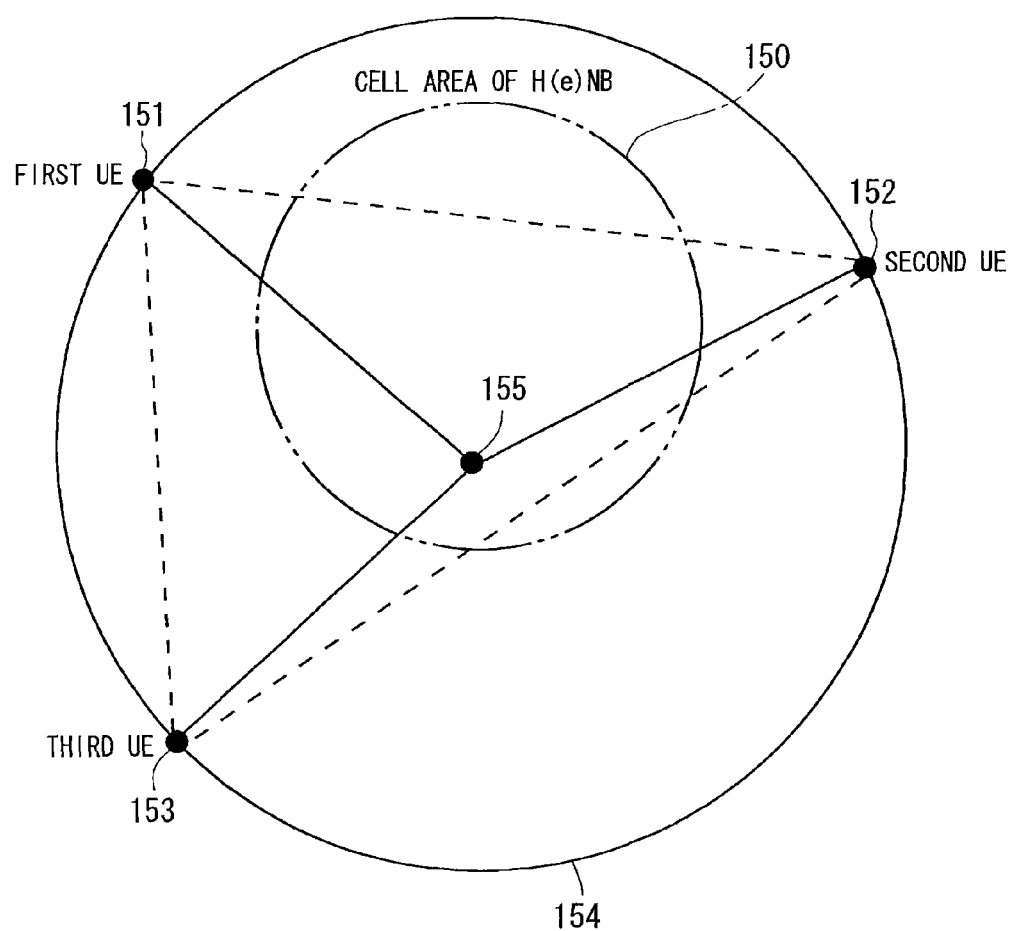

RADIO COMMUNICATION SYSTEM, USER EQUIPMENT DEVICE, BASE STATION DEVICE, AND MANAGEMENT DEVICE

TECHNICAL FIELD

The present invention relates to a radio communication system that performs radio communications between a user equipment device and a base station device, and a user equipment device, a base station device, and a management device that are included in the radio communication system, and more particularly, to a radio communication system including a movable base station device, and a user equipment device, a base station device, and a management device that are included in the radio communication system.

BACKGROUND ART

One example of the radio communication systems is a mobile communication system such as a cellular telephone system. The mobile communication system has a function aimed for estimating the location of a user equipment device for the purpose of, for example, commercial services using location information, management of the own system, emergency location identification, and location identification of a user equipment device for legal reasons such as a criminal investigation.

The method of estimating the location of a user equipment device is disclosed in, for example, Non-Patent Document 2 (Chapter 4.3) and Non-Patent Document 3 (Chapter 4.3).

In the mobile communication system, movable base station devices such as femtocells (H(e)NB) or mobile relays (e)NBs may be used for improving radio access performance.

The above-mentioned methods of estimating the location of a user equipment device disclosed in Non-Patent Documents 2 and 3 are predicated on that the location of the base station device is evident. If a movable base station device is present as described above and its location is not evident, as disclosed in Non-Patent Document 4, a problem that the location of a user equipment device becomes difficult to be estimated arises.

The location of the base station device is not evident, and thus, the location of the base station device cannot be identified when a problem occurs in a radio network, causing a problem in system maintenance, such as longer time required to solve the above-mentioned problem.

The methods of estimating the location of a base station device are disclosed in, for example, Non-Patent Document 5 and Patent Documents 1 to 3. Non-Patent Document 5 discloses that the function of estimating the location of a user equipment device using a radio wave from another fixed base station device or the global navigation satellite system (GNSS) function are provided to a base station device, to thereby estimate the location of the base station device.

Patent Document 1 discloses the method of estimating the location of a base station device in a case where a user equipment device is in a coverage of specific femtocell can receive signals from a global positioning system (GPS) satellite and in a case where the user equipment device can detect other neighbor macro cells. Patent Documents 2 and 3 disclose the technologies of estimating, upon emergency call, a femtocell of which coverage a user equipment device is currently in, from the past in-area information.

PRIOR ART DOCUMENTS

Patent Documents

Patent Document 1: Japanese Patent Application Laid-Open No. 2010-219753
Patent Document 2: Japanese Patent Application Laid-Open No. 2009-225015
Patent Document 3: Japanese Patent Application Laid-Open No. 2010-114685

Non-Patent Documents

Non-Patent Document 1: 3GPP TS23.271 v10.2.0 (2011-03)
Non-Patent Document 2: 3GPP TS36.305 v10.2.0 (2011-06)
Non-Patent Document 3: 3GPP TS25.305 v10.0.0 (2010-09)
Non-Patent Document 4: 3GPP R3-100342, TSG-RAN WG3 #66bis, 18-22 Jan. 2010, Valencia, Spain
Non-Patent Document 5: 3GPP R3-110729, TSG RAN WG3 #71, 21-25 Feb. 2011, Taiwan

SUMMARY OF INVENTION

Problems to be Solved by the Invention

The method disclosed in Non-Patent Document 5 cannot be applied to a case where a base station device is installed in an area undetectable by, for example, a GPS satellite or an area undetectable by a neighboring cell.

The technology disclosed in Patent Document 1 cannot be applied to a case where a user equipment device in the coverage is located in an area undetectable by a GPS satellite or an area undetectable by a neighbor cell.

The technologies disclosed in Patent Documents 2 and 3 need a trigger such as an emergency call and thus cannot estimate the location of a base station device if there is no emergency call. Also, the technologies disclosed in Patent Documents 2 and 3 are not aimed for identifying the location of a femtocell base station. The location of the femtocell base station cannot be identified even using the technologies disclosed in Patent Documents 2 and 3.

An object of the present invention is to provide a radio communication system capable of easily estimating the location of a base station device, which is movable, to thereby easily estimate the location of a user equipment device using the estimation results, and also provide a user equipment device, a base station device, and a management device to be included in the radio communication system.

Means to Solve the Problems

A radio communication system of the present invention includes a movable user equipment device, a base station device configured to perform radio communication with the user equipment device, and a management device, wherein: the base station device is movable; at least any one of the user equipment device, the base station device, and the management device includes location estimation processing unit that performs a measurement and a calculation for estimating base station location information being information regarding a location of the base station device, to thereby estimate the base station location information; the management device is configured to perform at least one process of radio communication control in communication between the user equipment device and the base station device, control of a communication call, management of moving of the user equipment device, management of the radio communication system, and management of location information of the devices constituting the radio communication system; and the management device performs the process based on the base station location information estimated by the location estimation processing unit.

A user equipment device of the present invention is included in a radio communication system including a movable user equipment device, a base station device configured to perform radio communication with the user equipment device, and a management device, the radio communication system being a radio communication system in which the management device is configured to perform at least one process of radio communication control in communication between the user equipment device and the base station device, control of a communication call, management of moving of the user equipment device, management of the radio communication system, and management of location information of the devices constituting the radio communication system, and the management device performs the process based on base station location information, being information regarding a location of the base station device, estimated by location estimation processing unit that performs a measurement and a calculation for estimating the base station location information, wherein the user equipment device comprises location estimation processing unit, and the user equipment device provides the management device or the base station device with information obtained by the location estimation processing unit.

A base station device of the present invention is included in a radio communication system including a movable user equipment device, a base station device configured to perform radio communication with the user equipment device, and a management device, the radio communication system being a radio communication system in which the management device is configured to perform at least one process of radio communication control in communication between the user equipment device and the base station device, control of a communication call, management of moving of the user equipment device, management of the radio communication system, and management of location information of the devices constituting the radio communication system, and the management device performs the process based on base station location information, being information regarding a location of the base station device, estimated by location estimation processing unit that performs a measurement and a calculation for estimating the base station location information, to thereby estimate the base station location information, wherein: the base station device is movably installed; the base station device comprises location estimation processing unit, and the base station device provides the management device with the base station location information estimated by the location estimation processing unit.

A management device of the present invention is included in a radio communication system including a movable user equipment device, a base station device configured to perform radio communication with the user equipment device, and a management device, the management device including location estimation processing unit that performs a calculation for estimating base station location information being information regarding a location of the base station device, to thereby estimate the base station location information, wherein the management device is configured to perform at least one process of radio communication control in communication between the user equipment device and the base station device, control of a communication call, management of moving of the user equipment device, management of the radio communication system, and management of location information of devices constituting the radio communication system, and performs the process based on the base station location information estimated by the location estimation processing unit.

Effects of the Invention

According to the radio communication system of the present invention, the location estimation processing unit included in at least any one of the user equipment device, base station device, and management device performs a measurement and a calculation for estimating base station location information, to thereby estimate the base station location information. The base station location information is, for example, the location and moving speed of the base station device. The management device performs the process based on the base station location information.

Therefore, if the base station device is movable, the location of the base station device can be estimated easily, and the location of the user equipment device can be estimated easily using the estimation results.

According to the user equipment device of the present invention, the location estimation processing unit performs a measurement and a calculation for estimating base station location information to estimate the base station location information, thereby providing the management device with the base station location information. This enables the management device to easily estimate the location of the base station device if the base station device is movable, thereby easily estimating the location of the user equipment device using the estimation results.

According to the base station device of the present invention, the location estimation processing unit performs a measurement and a calculation for estimating base station location information of the own device to estimate the base station location information of the own device, thereby providing the management device with the base station location information. This enables the management device to easily estimate the location of the base station device if the base station device is movable, thereby easily estimating the location of the user equipment device using the estimation results.

According to the management device of the present invention, the location estimation processing unit performs a measurement and a calculation for estimating base station location information to estimate the base station location information, and performs the process based on the base station location information. This enables the management device to easily estimate the location of the base station device if the base station device is movable, thereby easily estimating the location of the user equipment device using the estimation results.

These and other objects, features, aspects and advantages of the present invention will become more apparent from the following detailed description of the present invention when taken in conjunction with the accompanying drawings.

BRIEF DESCRIPTION OF DRAWINGS

FIG. 3 is a diagram illustrating transport channels used in the LTE mobile communication system.

FIG. 4 is a diagram illustrating logical channels used in the LTE mobile communication system.

FIG. 7 is a block diagram showing a configuration of a radio communication system 280 in a first embodiment of the present invention.

FIG. 12 is a diagram showing an exemplary sequence when a location of a UE is estimated using location estimation results of a movable eNB.

FIG. 14 is a diagram showing an exemplary sequence in a case where a timing at which the inter E-SMLC procedures are performed is different from that of FIG. 12.

FIG. 15 is a diagram showing an exemplary sequence in a case where a timing at which the inter E-SMLC procedures are performed is different from that of FIG. 12.

FIG. 24 is a diagram showing an exemplary sequence for a process of transmitting location information between radio access networks being served by different GMLCs for UE.

FIG. 25 is a diagram showing a positional relationship between a H(e)NB and UEs in a radio communication system 140.

FIG. 26 is a diagram for describing a location estimation method.

DESCRIPTION OF EMBODIMENTS

Underlying Technology

Prior to the description of a radio communication system of the present invention, the radio communication system of the underlying technology is described. The radio communication system is, for example, a mobile communication system.

Commercial service of a wideband code division multiple access (W-CDMA) system among so-called third-generation communication systems has been offered in Japan since 2001. The W-CDMA system is a communication system defined by the 3rd generation partnership project (3GPP) that is the standard organization regarding the mobile communication system, where the specifications of Release 10 version are produced.

Further, as communication systems independent of W-CDMA, new communication systems referred to as long term evolution (LTE) regarding radio areas and system architecture evolution (SAE) regarding the overall system configuration including a core network (merely referred to as network as well) are studied in 3GPP. This communication system is also referred to as 3.9 generation (3.9 G) system.

Figure 1:
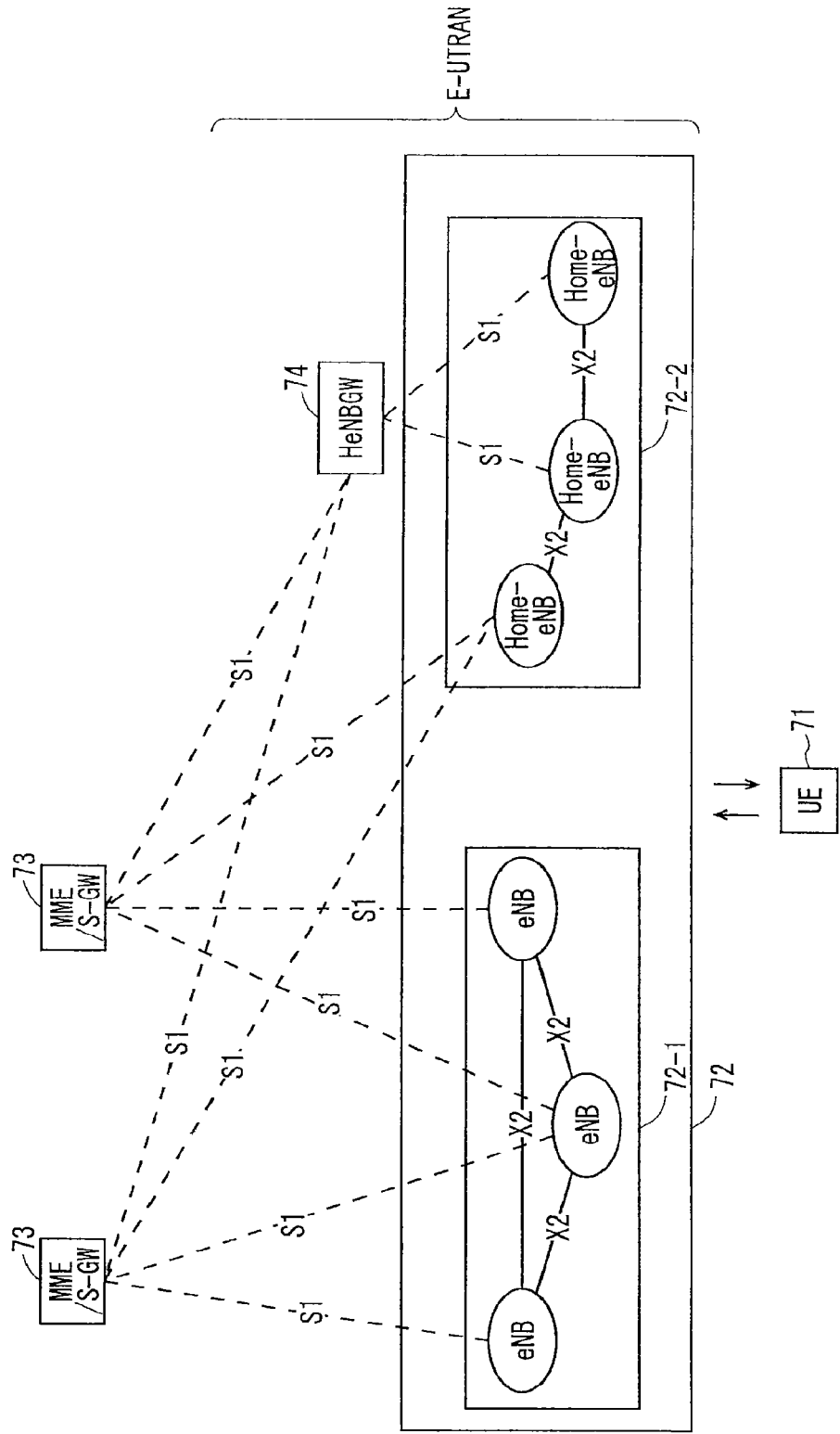
FIG. 1 is a block diagram showing an overall configuration of an LTE mobile communication system.

FIG. 1 is a block diagram showing an overall configuration of an LTE mobile communication system (see Chapter 4.6.1 of TS36.300 v10.3.0, 2010-03, (hereinafter, referred to as "Non-Patent Document 6") by 3GPP). The mobile communication system includes a mobile terminal device (hereinafter, also referred to as "mobile terminal" or "user equipment (UE)") 71, a device (hereinafter, referred to as "base station device") 72 that functions as a base station, an MME/S-GW unit 73, and a home-eNB gateway (HeNBGW) 74. The base station device (hereinafter, also referred to as "base station") 72 and HeNBGW 74 constitute an evolved universal terrestrial radio access network (E-UTRAN). In the LTE mobile communication system, the base station is referred to as E-UTRAN NodeB, eNodeB, or eNB.

The user equipment (UE) 71 is capable of performing radio communications with the base station 72 and transmits/receives signals through radio communications. The base stations 72 (E-UTRAN NodeB, eNodeB, eNB) includes an eNB 72-1 that is a macro cell and a Home-eNB 72-2 that is a local node. The eNB 72-1 has a relatively large-scale coverage as the coverage in a range in which communication with the user equipment (UE) 71 is allowed. The Home-eNB 72-2 has a relatively small-scale coverage as the coverage.

The MME/S-GW unit 73 includes any one of or both of a mobility management entity (abbreviated as MME) and a serving gateway (abbreviated as S-GW). Hereinafter, the MME/S-GW unit 73 may be referred to as "MME unit".

The eNB 72-1 is connected to the MME unit 73 by means of an S1 interface, and control information is communicated between the eNB 72-1 and the MME unit 73. A plurality of MME units 73 may be connected to one eNB 72-1. The eNBs 72-1 are connected to each other by means of an X2 interface, and control information is communicated between the eNBs 72-1.

The Home-eNB 72-2 is connected to the MME unit 73 by means of an S1 interface, and the control information is communicated between the Home-eNB 72-2 and the MME unit 73. A plurality of Home-eNBs 72-2 are connected to one MME unit 73. Alternatively, the Home-eNBs 72-2 are connected to the MME units 73 through the HeNBGW 74.

The Home-eNBs 72-2 are connected to the HeNBGW 74 by means of an S1 interface. The HeNBGW 74 is connected to the MME units 73 by means of an S1 interface. One or a plurality of Home-eNBs 72-2 are connected to one HeNBGW 74, and information is communicated therebetween through the S1 interface. The HeNBGW 74 is connected to one or a plurality of MME units 73, and information is communicated therebetween through the S1 interface. The MME unit 73 and HeNBGW 74 are equivalent to host node devices, and control the connection between the user equipment (UE) 71 and each of the eNB 72-1 and Home-eNB 72-2 being base stations.

Further, the configuration below is studied in 3GPP. The X2 interface between the Home-eNBs 72-2 is supported. That is, the Home-eNBs 72-2 are connected to each other by means of the X2 interface, and control information is communicated between the Home-eNBs 72-2. The HeNBGW 74 appears to the MME unit 73 as the Home-eNB 72-2. The HeNBGW 74 appears to the Home-eNB 72-2 as the MME unit 73.

The interfaces between the Home-eNBs 72-2 and the MME units 73 are the same, which are the S1 interfaces, in both of the case where the Home-eNB 72-2 is connected to the MME unit 73 through the HeNBGW 74 and the case where the Home-eNB 72-2 is directly connected to the MME unit 73. The HeNBGW 74 does not support the mobility to the Home-eNB 72-2 or the mobility from the Home-eNB 72-2 that spans the plurality of MME units 73. The Home-eNB 72-2 constitutes and supports a single cell.

In the LTE mobile communication system, E-UTRAN supports relaying by having a relay station (hereinafter, also referred to as a relay node (RN) (see Chapter 4.7 of Non-Patent Document 6). The relay node supports the base station functionality meaning it terminates the radio protocols of the E-UTRA radio interface, and the S1 and X2 interfaces. In addition to the base station functionality, the relay node also supports a subset of the user equipment functionality, in order to wirelessly connect to a donor eNB (DeNB). The subset of the user equipment functionality includes, for example, a physical layer, layer-2, RRC, and NAS functionality. Here, a "base station device" or "base station" also includes a relay station. In other words, the terms "base station device" and "base station" include a relay station.

As to the base station, for example, one base station constitutes one cell. In this case, the cell corresponds to a base station. Not limited to the above, one base station may constitute a plurality of cells. In this case, every cell corresponds to a base station.

Figure 2:
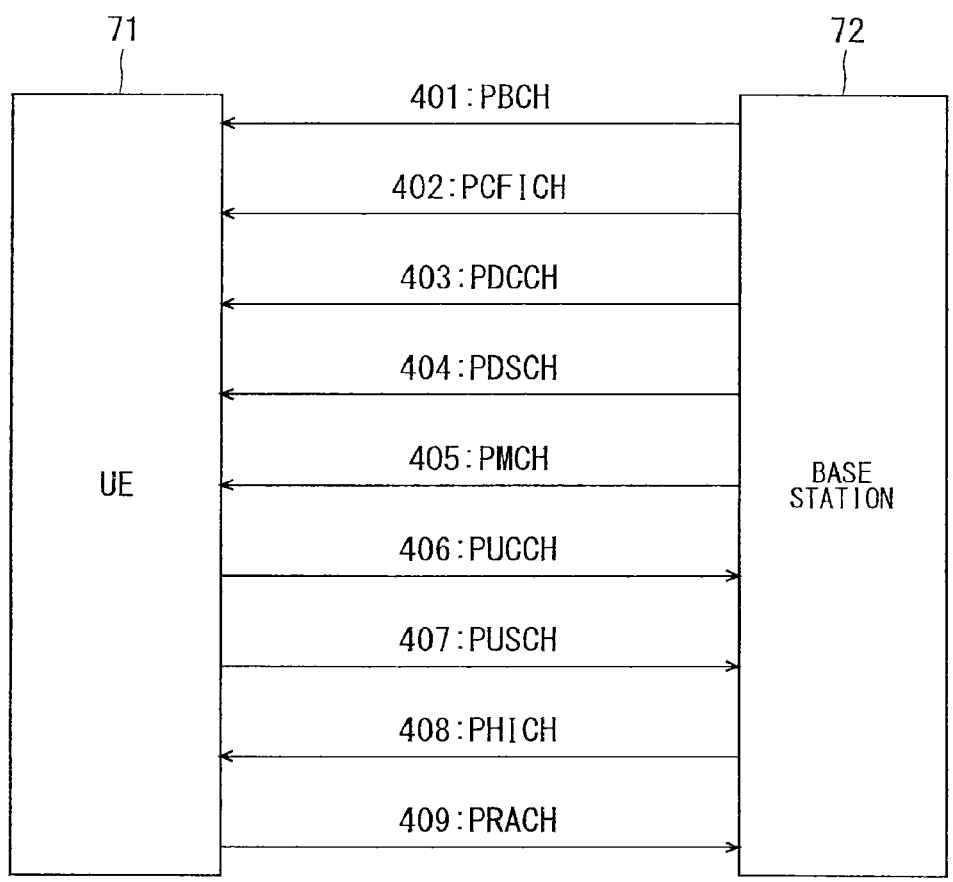
FIG. 2 is a diagram illustrating physical channels used in the LTE mobile communication system.

As to the channel configuration in the LTE mobile communication system, the following is decided in 3GPP (see Non-Patent Document (Chapter 5)). Physical channels are described with reference to FIG. 2. FIG. 2 is a diagram illustrating the physical channels used in the LTE mobile communication system.

As shown in FIG. 2, a physical broadcast channel (PBCH) 401 is a channel for downlink transmission from the base station 72 to the user equipment 71. A BCH transport block is mapped to four subframes within a 40 ms interval. There is no explicit signaling indicating 40 ms timing.

A physical control format indicator channel (PCFICH) 402 is a channel for downlink transmission from the base station 72 to the user equipment 71. The PCFICH notifies the number of OFDM symbols used for physical downlink control channels (PDCCHs) from the base station 72 to the user equipment 71. The PCFICH is transmitted in each subframe.

A physical downlink control channel (PDCCH) 403 is a channel for downlink transmission from the base station 72 to the user equipment 71. The PDCCH notifies the resource allocation information of a downlink shared channel (DL-SCH) that is one of the transport channels shown in FIG. 3 described below, the resource allocation information of a paging channel (PCH) that is one of the transport channels shown in FIG. 3, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is a channel for downlink transmission from the base station 72 to the user equipment 71. At least one of a downlink shared channel (DL-SCH) and a PCH that are transport channels is mapped to the PDSCH.

A physical multicast channel (PMCH) 405 is a channel for downlink transmission from the base station 72 to the user equipment 71. A multicast channel (MCH) that is a transport channel is mapped to the PMCH.

A physical uplink control channel (PUCCH) 406 is a channel for uplink transmission from the user equipment 71 to the base station 72. The PUCCH carries Ack/Nack that is a response signal to downlink transmission. The PUCCH carries a channel quality indicator (CQI) report. The CQI is quality information indicating the quality of the received data or channel quality. In addition, the PUCCH carries a scheduling request (SR).

A physical uplink shared channel (PUSCH) 407 is a channel for uplink transmission from the user equipment 71 to the base station 72. An uplink shared channel (UL-SCH) that is one of the transport channels shown in FIG. 3 is mapped to the PUSCH.

A physical hybrid ARQ indicator channel (PHICH) 408 is a channel for downlink transmission from the base station 72 to the user equipment 71. The PHICH carries Ack/Nack that is a response signal to uplink transmission. A physical random access channel (PRACH) 409 is a channel for uplink transmission from the user equipment 71 to the base station 72. The PRACH carries a random access preamble.

A downlink reference signal is a known symbol in a mobile communication system. Five types of downlink reference signals are defined as follows; cell-specific reference signals (CRSs), MBSFN reference signals, demodulation reference signals (DM-RSs) being UE-specific reference signals, positioning reference signals (PRSs), and channel-state information reference signals (CSI-RSs). The physical layer measurement objects of a user equipment include reference signal received power (RSRP) measurement.

The transport channels are described with reference to FIG. 3. FIG. 3 is a diagram illustrating transport channels used in the LTE mobile communication system. Part (A) of FIG. 3 shows mapping between a downlink transport channel and a downlink physical channel. Part (B) of FIG. 3 shows mapping between an uplink transport channel and an uplink physical channel.

Among the downlink transport channels shown in part (A) of FIG. 3, a broadcast channel (BCH) is broadcast to the entire coverage of a base station (cell). The BCH is mapped to a physical broadcast channel (PBCH).

Retransmission control according to a hybrid ARQ (HARQ) is applied to a downlink shared channel (DL-SCH). The DL-SCH enables broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

A paging channel (PCH) supports DRX of the user equipment for enabling the user equipment to save power. The PCH is required to be broadcast to the entire coverage of the base station (cell). The PCH is mapped to physical resources such as a physical downlink shared channel (PDSCH) that can be used dynamically for traffic.

A multicast channel (MCH) is used for broadcast to the entire coverage of the base station (cell). The MCH supports SFN combining of MBMS service (MTCH and MCCH) in multi-cell transmission. The MCH supports semi-static resource allocation. The MCH is mapped to the PMCH.

Among the uplink transport channels shown in part (B) of FIG. 3, retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH)

A random access channel (RACH) is limited to control information. The RACH involves a collision risk. The RACH is mapped to the physical random access channel (PRACH).

Logical channels are described with reference to FIG. 4 (see Non-Patent Document 6 (Chapter 6)). FIG. 4 is a diagram illustrating logical channels used in an LTE mobile communication system. Part (A) of FIG. 4 shows mapping between a downlink logical channel and a downlink transport channel. Part (B) of FIG. 4 shows mapping between an uplink logical channel and an uplink transport channel.

A broadcast control channel (BCCH) is a downlink channel for broadcast system control information. The BCCH that is a logical channel is mapped to a broadcast channel (BCH) or downlink shared channel (DL-SCH) that is a transport channel.

A paging control channel (PCCH) is a downlink channel for transmitting changes of the paging information and system information. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in a case where the user equipments have no radio resource control (RRC) connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to a multicast channel (MCH) that is a transport channel.

A dedicated control channel (DCCH) is a channel for point-to-point transmission of the dedicated control information between a user equipment and a network. The DCCH is used when a user equipment is in RRC connection. The DCCH is mapped to an uplink shared channel (UL-SCH) in uplink and mapped to a downlink shared channel (DL-SCH) in downlink.

A dedicated traffic channel (DTCH) is a point-to-point communication channel for transmission of the user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

The mobile communication system may use a movable base station device such as a femtocell base station (for example, H(e)NB) or a mobile radio relay station (for example, a mobile relay (e)NB or mobile relay node) for improving radio access capabilities. Here, "H(e)NB" represents Home eNB and Home NB. "(e)NB" represents eNB and NB.

Examples of the method of estimating the location of a base station device include the methods disclosed in Non-Patent Document 5 and Patent Documents 1 to 3 described above. However, if a movable base station device is located, estimating the location of the base station device is difficult even with the use of those methods. The location of the base station device is not evident, and thus, estimating the location of the user equipment device is also difficult.

Thus, there is required a radio communication system capable of, in a case where a base station device is movable, easily estimating the location of the base station device and then easily estimating the location of the user equipment device using the estimation results. The present invention therefore employs the configurations of embodiments below.

First Embodiment

The present embodiment will describe a case in which the present invention is applied to a movable base station belonging to an E-UTRAN and a radio communication system including the same.

Figure 5:
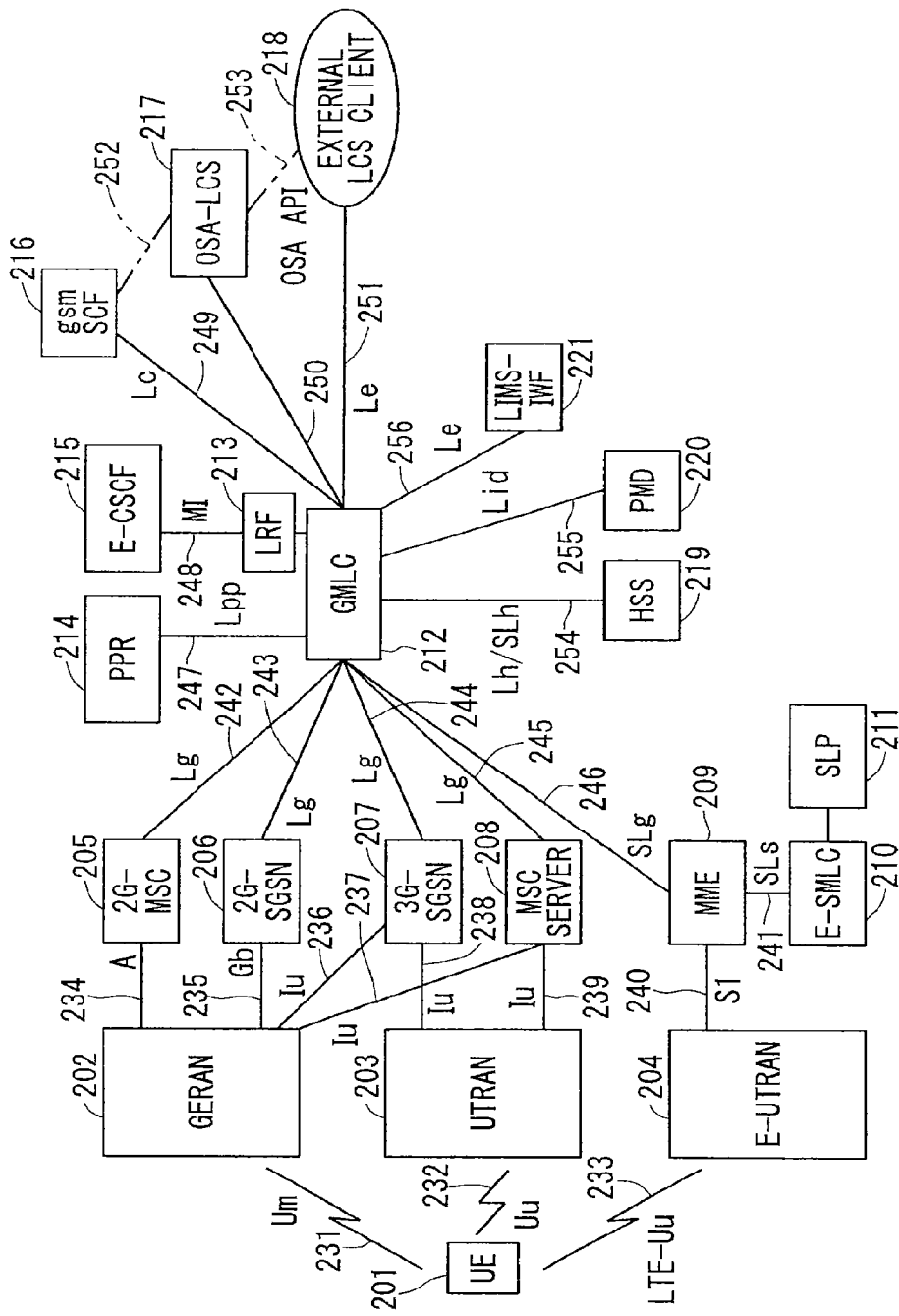
FIG. 5 is a block diagram showing a configuration of a mobile network system 200.

FIG. 5 is a block diagram showing a configuration of a mobile network system 200. The mobile network system 200 shown in FIG. 5 has a functionality of estimating the location of a UE disclosed in FIG. 6.1-1 of Non-Patent Document 1. Hereinafter, "location estimation" may be referred to as "positioning" and location estimation of a UE may be referred to as "UE positioning".

Location estimation (positioning) refers to measuring any signal regarding a location and estimating a geographical location and a moving speed of a location estimation target from the measured information (see Chapter 4.2 of Non-Patent Document 3 and Chapter 4.2 of Non-Patent Document 2).

The mobile network system 200 includes a UE 201, a global system for mobile communications (GSM (registered trademark)) and enhanced digital rates for GSM evolution (EDGE) radio access network (GERAN) 202, a universal terrestrial radio access network (UTRAN) 203, an E-UTRAN 204, a second generation-mobile services switching centre (2G-MSC) 205, a second generation-serving general packet radio service (GPRS) support node (2G-SGSN) 206, a third generation (3G) SGSN 207, an MSC server 208, an MME 209, an evolved serving mobile location centre (E-SMLC) 210, a secure user plane location (SUPL) location platform (SLP) 211, a gateway mobile location centre (MLC) (GMLC) 212, a location retrieval function (LRF) 213, a privacy profile register (PPR) 214, an emergency call service control function (CSCF) (E-CSCF) 215, a gsmSCF 216, an open service access-location services (OSA-LCS) 217, an external LCS client 218, a home subscriber server (HSS) 219, a pseudonym mediation device functionality (PMD) 220, and a location IP multimedia subsystem-interworking function (LIMS-IWF) 221.

Among the devices constituting the mobile network system 200, those except for the user equipment device (such as the UE 201) and the base station device (such as the eNB in the E-UTRAN 204), for example, the 2G-MSC 205, 2G-SGSN 206, 3G-SGSN 207, MSC server 208, MME 209, E-SMLC 210, SLP 211, GMLC 212, LRF 213, PPR 214, E-CSCF 215, gsmSCF 216, OSA-LCS 217, external LCS client 218, HSS 219, PMD 220, and LIMS-IWF 221 correspond to management devices.

The UE 201 and GERAN 202 are connected by a Um interface 231. The UE 201 and UTRAN 203 are connected by a Uu interface 232. The UE 201 and E-UTRAN 204 are connected by an LTE-Uu interface 233.

The GERAN 202 and 2G-MSC 205 are connected by an A interface 234. The GERAN 202 and 2G-SGSN 206 are connected by a Gb interface 235. The GERAN 202 and 3G-SGSN 207 are connected by an Iu interface 236. The GERAN 202 and MSC server 208 are connected by an Iu interface 237.

The UTRAN 203 and 3G-SGSN 207 are connected by an Iu interface 238. The UTRAN 203 and MSC server 208 are connected by an Iu interface 239.

The E-UTRAN 204 and MME 209 are connected by an S1 interface 240. The MME 209 and E-SMLC 210 are connected by an SLs interface 241. The E-SMLC 210 is connected to the SLP 211.

The GMLC 212 and 2G-MSC 205 are connected by an Lg interface 242. The GMLC 212 and 2G-SGSN 206 are connected by an Lg interface 243. The GMLC 212 and 3G-SGSN 207 are connected by an Lg interface 244. The GMLC 212 and MSC server 208 are connected by an Lg interface 245. The GMLC 212 and MME 209 are connected by an SLg interface 246.

The GMLC 212 and PPR 214 are connected by an Lpp interface 247. The GMLC 212 is connected to the LRF 213. The GMLC 212 is connected to the E-CSCF 215 through the LRF 213. The LRF 213 is provided separately from the GMLC 212 but may be configured to include the GMLC 212. The LRF 213 and E-CSCF 215 are connected by an MI interface 248.

The GMLC 212 and gsmSCF 216 are connected by an Lc interface 249. The GMLC 212 and OSA-LCS 217 are connected by a dedicated interface 250. The GMLC 212 and external LCS client 218 are connected by an Le interface 251. The gsmSCF 216 and OSA-LCS 217 can be connected by a dedicated interface 252. The OSA-LCS 217 and external LCS client 218 can be connected by an OSA API 253.

The GMLC 212 and HSS 219 are connected by an Lh/SLh interface 254. The GMLC 212 and PMD 220 are connected by a Lid interface 255. The GMLC 212 and LIMS-IWF 221 are connected by an Le interface 256.

The GERAN 202 is a radio access network of a global system for mobile communications (GSM) being a second generation (2G) radio communication system. The UTRAN 203 is a radio access network of a universal mobile telecommunications system (UMTS) being a third generation (3G) radio communication system. The E-UTRAN 204 is a radio access network of an evolved UMTS being a 3.9 generation (3.9 G) radio communication system.

The 2G-MSC 205 and MSC server 208 control and manage circuit switch calls, perform the process of authorizing the UE 201, and manage requests regarding the location estimation of the UE 201.

The 2G-SGSN 206 and 3G-SGSN 207 control and manage packet switching calls, perform the process of authorizing the UE 201, and manage requests regarding the location estimation of the UE 201.

The MME 209 controls and manages calls at the E-UTRAN 204, performs the process of authorizing the UE 201, and manages requests regarding the location estimation of the UE 201.

The E-SMLC 210 controls the location estimation of the UE 201 being in the service area of E-UTRAN 204 and performs a computation.

The SLP 211 is an entity that manages a secure user plane location (SUPL) service defined by an open mobile alliance (OMA) and determines a location (see OMA-AD-SUPL v2.0).

The GMLC 212 has main functionality regarding a location service and functions as an interface with a plurality of radio access networks of the same PLMN and an interface with other PLMN.

The LRF 213 is an entity that has the function of retrieving the location information of the UE 201 in which an emergency communication session such as an emergency call in an IP multimedia subsystem (IMS) architecture has been established.

The PPR 214 is an entity that maintains and manages the profile (information) regarding the subscriber privacy.

The E-CSCF 215 is an entity that controls an emergency communication session such as an emergency call in an IMS architecture.

The gsmSCF 216 is a GSM system control function to support customised applications for mobile enhanced logic (CAMEL) access for LCS.

The OSA-LCS 217 is an OSA for using a network function for location information service. The OSA-LCS 217 is a group of functions that provide an open application programming interface (API) (for example, see TS22.127, TS23.198, and TS29.198 by 3GPP).

The external LCS client 218 is a client that can request a measurement of the location of the UE 201 outside the mobile network system 200.

The HSS 219 is a subscriber information management entity that manages the subscriber information. The PMD 220 functions to associate a pseudonym in a case where communication regarding a location information service is performed using the pseudonym and the information for identifying subscribers such as a mobile subscriber integrated services digital network number (MSISDN) and an international mobile subscriber identity (IMSI) for privacy protection.

The LIMS-IWF 221 has a function for interconnection with other network in a system based on an IP multimedia subsystem (IMS) architecture in a location service. For example, the LIMS-IWF 221 has a function of exchanging public user identity of an IMS of a certain subscriber.

Figure 6:
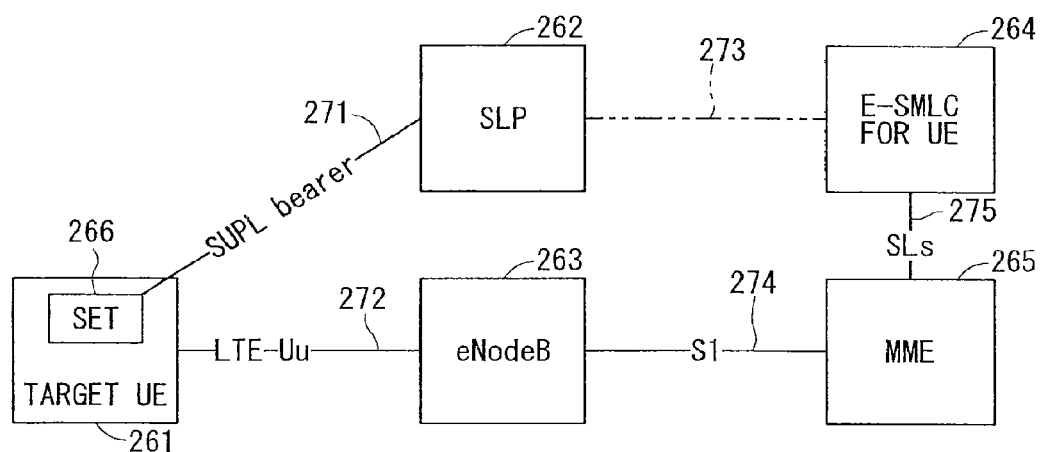
FIG. 6 is a block diagram showing a configuration of a radio communication system 260 of the related art in an E-UTRAN.

FIG. 6 is a block diagram showing a configuration of a radio communication system 260 of the related art in the E-UTRAN. The radio communication system 260 of the related art in the E-UTRAN shown in FIG. 6 is disclosed in FIG. 5-1 of Non-Patent Document 2.

The radio communication system 260 includes a target UE 261, an SLP 262, an eNodeB 263, an E-SMLC for UE 264, and an MME 265. The target UE 261 includes a SUPL enabled terminal (SET) 266.

The target UE 261 and eNodeB 263 are connected by an LTE-Uu interface 272. The eNodeB 263 and MME 265 are connected by an S1 interface 274. The E-SMLC for UE 264 and MME 265 are connected by an SLs interface 275.

A logical connection is established between the SET 266 in the target UE 261 and the SLP 262. This is referred to as a secure user plane location (SUPL) bearer 271. The SLP 262 and E-SMLC for UE 264 can be connected by a dedicated interface 273.

The E-UTRAN NodeB (eNodeB) 263 is a base station device that terminates a radio communication protocol in the E-UTRAN.

The secure user plane location (SUPL) bearer 271, the SLP 262, and the SET 266 are entities that have specified functions in a SUPL defined by an open mobile alliance (OMA) (see OMA-AD-SUPL v2.0).

The SUPL bearer 271 is a user bearer on which the SUPL is used. The SLP 262 is an entity that manages a SUPL service and determines a location. The SET 266 is an equipment function including a SUPL communication function.

The target UE 261, MME 265, and E-SMLC for UE 264 have configurations similar to those of the UE 201, MME 209, and E-SMLC 210 in the mobile network system 200 shown in FIG. 5 described above, respectively.

FIG. 7 is a block diagram showing a configuration of a radio communication system 280 in the first embodiment of the present invention. The radio communication system 280 includes a target UE 261, SLP 262, eNodeB 263, E-SMLC for UE 264, and MME (hereinafter, also referred to as "first MME") 265 similar to those of the radio communication system 260 shown in FIG. 6 described above, a vehicular system 281, a target eNodeB_uu 282, a UE 283, an eNodeB 284, a target eNodeB_s1 285, a second MME 286, and an E-SMLC for eNB 287.

The vehicular system 281 and target eNodeB_uu 282 are connected by a V interface 291. The vehicular system 281 and target eNodeB_s1 285 are connected by a V interface 293.

The target eNodeB_uu 282 and UE 283 are connected by an LTE-Uu interface 292. The target eNodeB_uu 282 and eNodeB 284 are connected by an LTE-Uu interface 294. The target eNodeB_uu 282 and eNodeB 284 may be connected by an LTE-Un interface.

The UE 283 and target eNodeB_s1 285 are connected by an LTE-Uu interface 295.

The eNodeB 284 and second MME 286 are connected by an S1 interface 296. The target eNodeB_s1 285 and second MME 286 are connected by an S1 interface 297.

The second MME 286 and E-SMLC for eNB 287 are connected by an SLs interface 298. The E-SMLC for eNB 287 and E-SMLC for UE 264 are connected by an SLLs interface 299.

In the radio communication system 280 shown in FIG. 7, an E-SMLC for eNB 287 is newly provided in addition to the E-SMLC for UE 264 that is used in location estimation of a UE in the conventional radio communication system 260 shown in FIG. 6.

The vehicular system 281 is configured so as to, in a case where an eNodeB is installed in a structure (hereinafter, also referred to as a "mobile structure") assumed to move, such as a train or an automobile, measure and estimate the information regarding location estimation such as a location and a speed of the mobile structure. The E-SMLC for eNB 287 is an entity that manages and calculates the location information of an eNodeB in the E-UTRAN.

The target eNodeB_uu 282 is a movable eNodeB. The target eNodeB_uu 282 is an eNodeB wirelessly connected with the network side by a radio connection interface such as an LTE-Uu interface or an LTE-Un interface. The target eNodeB_uu 282 is, for example, a mobile relay node.

The target eNodeB_s1 285 is an eNodeB to be in wired connection with the network side by a wired connection interface such as an S1 interface. The target eNodeB_s1 285 is, for example, a femtocell base station (HeNB).

FIG. 7 is a diagram showing a logical configuration, not a physical configuration. For example, FIG. 7 shows the E-SMLC for eNB 287 and E-SMLC for UE 264 independently of each other, which does not mean that the E-SMLC for eNB 287 and E-SMLC for UE 264 are devices physically independent of each other. The E-SMLC for eNB 287 and E-SMLC for UE 264 may be configured as separate devices or may be configured as one device.

Table 1 shows the functions regarding location estimation of the logical blocks shown in FIG. 7. Table 1 indicates, by a symbol "o", the logical block in which each function is provided.

TABLE 1

| | | Vehicular system | UE | E-UTRAN eNB_uu/s1 | eNB | MME | E-SMLC for UE | E-SMLC for eNB |
|---|---|---|---|---|---|---|---|---|
| 301 | PRCF for UE | | | | | | o | |
| | PCF for UE | | o | | | | o | |
| | PSMF for UE | | o | o | o | | | |
| | PRRM for UE | | | o | o | | | |
| | PRCF for eNB | | | | | | | o |
| | PCF for eNB | o(E_PM_6) | o(E_PM_4) | o | | | | o |
| | PSMF for eNB | o(E_PM_6) | o(E_PM_4) | o(E_PM_1, 2, 3, 4, 5) | o(E_PM_1, 2, 3, 5) | | | |
| | PRRM for eNB | | | | o | | | |
| 302 | LCF for UE | | o | | | | o | o |
| | LCF for eNB | | | o | | | o | o |
| 303 | LSCF for UE | | | | | | o | |
| | LSBF for UE | | | | | | o | |
| | LSOF for UE | | o | o | o | | o | |
| | LSBcF for UE | | | o | o | | o | |
| | LSCTF for UE | | | | | | | |
| | LIMS-IWF for UE | | | | | | | |
| | LSCF for eNB | | | | | | o | |
| | LSBF for eNB | | | | | | | |
| | LSOF for eNB | | | o | o | | | o |
| | LSBcF for eNB | | | o | | | | o |
| | LSCTF for eNB | | | | | | | |
| | LIMS-IWF for eNB | | | | | | | |

In Table 1, location estimation functions (positioning functions) 301 include a PRCF for UE, PCF for UE, PSMF for UE, PRRM for UE, PRCF for eNB, PCF for eNB, PSMF for eNB, and PRRM for eNB.

Among the location estimation functions 301, the PRCF for UE, PCF for UE, PSMF for UE, and PRRM for UE correspond to the positioning radio co-ordination function (PRCF), positioning calculation function (PCF), positioning signal measurement function (PSMF), and positioning radio resource management (PRRM) described in Chapters 5 and 6 of Non-Patent Document 1.

Among the location estimation functions 301, the PRCF for eNB, PCF for eNB, PSMF for eNB, and PRRM for eNB are aimed to estimate the location of the eNB, and the contents thereof are similar to those of the functions described in Chapters 5 and 6 of Non-Patent Document 1.

Location client functions (LCFs) 302 include an LCF for UE and an LCF for eNB.

System handling functions 303 include an LSCF for UE, LSBF for UE, LSOF for UE, LSBcF for UE, LSCTF for UE, LIMS-IWF for UE, LCF for eNB, LSCF for eNB, LSBF for eNB, LSOF for eNB, LSBcF for eNB, LSCTF for eNB, and LIMS-IWF for eNB.

The LCF for UE among the location client functions 302 and the LSCF for UE, LSBF for UE, LSOF for UE, LSBcF for UE, LSCTF for UE, and LIMS-IWF for UE among the system handling functions 303 correspond to the location client function (LCF), location system control function (LSCF), location system billing function (LSBF), location system operations function (LSOF), location system broadcast function (LSBcF), location system co-ordinate transformation function (LSCTF), and location IMS interworking function (LIMS-IWF) described in Chapters 5 and 6 of Non-Patent Document 1, similarly to the functions of the location estimation functions 301.

Among the system handling functions 303, the LCF for eNB, LSCF for eNB, LSBF for eNB, LSOF for eNB, LSBcF for eNB, LSCTF for eNB, and LIMS-IWF for eNB are aimed to estimate the location of the eNB similarly to the location estimation functions 301, and the contents thereof are similar to the functions described in Chapters 5 and 6 of Non-Patent Document 1.

As indicated by the symbol "o" in Table 1, the PCF for eNB being a PCF for an eNB among the location estimation functions 301 is arranged in the vehicular system, UE, eNB_uu/s1, and E-SMLC for eNB. The PSMF for eNB being a PSMF for an eNB among the location estimation functions 301 is arranged in the vehicular system, UE, eNB_uu/s1, and eNB. Among the location estimation functions 301, the PRRM for eNB being a PRRM for an eNB is arranged in the eNB. Among the location estimation functions 301, the PRCF for eNB being a PRCF for an eNB is arranged in the E-SMLC for eNB.

The PSMF for eNB arranged in the eNB_uu/s1 is for a signal of a GNSS (hereinafter, also referred to as "GNSS signal") and a signal of other eNB and is applied to a case where the E_PM_1, E_PM_2, E_PM_3, E_PM_4, or E_PM_5 is used as the positioning method.

The PCF for eNB and PSMF for eNB arranged in the UE function similarly to the UE location estimation and are applied to a case where the E_PM_4 is used as the positioning method.

The PCF for eNB and PSMF for eNB arranged in the vehicular system relate to the location information measured or estimated in a moving structure such as a train operation system and a car navigation system and are applied to a case in which the E_PM_6 is used as the positioning method.

The PSMF for eNB arranged in the eNB is applied to a case in which the E_PM_1, E_PM_2, E_PM_3, or E_PM_5 is used as the positioning method. The positioning method will be described below.

The LCF for eNB of the location client functions 302 for the eNB is arranged in the eNB_uu/s1, MME, and E-SMLC for eNB.

The LCF for eNB arranged in the eNB_uu/s1 is installed to reset and again request a location measurement when, for example, an eNB is reset and when an eNB, whose arrangement location can be changed but which is basically operated while being fixed, detects a movement.

The LCF for eNB arranged in the E-SMLC for eNB is installed for requesting location estimation when, for example, a measurement is additionally required based on the location estimation results.

As to the logical block in which an LCF for UE of the location client functions 302 for the UE is installed, an E-SMLC for eNB is provided in addition to the UE and MME being the logical blocks described in Table 6.2a of Non-Patent Document 1. This is installed for activating UE location estimation to improve the accuracy in eNB location estimation.

Next, the positioning methods will be described. Table 2 shows six positioning methods.

TABLE 2

| No. | Positioning Methods |
| --- | --- |
| E_PM_1 | Network-assisted GNSS method |
| E_PM_2 | Downlink positioning method |
| E_PM_3 | Enhanced cell ID method |
| E_PM_4 | Method based on UE tracking information |
| E_PM_5 | Method based on mobile eNB tracking information |
| E_PM_6 | Method based on assisted vehicular information |

In location estimation, management is performed through division into three types, a "fixed eNB" not being a location estimation target, an "eNB whose arrangement location can be changed but which is basically operated while being fixed" being a location estimation target such as a HeNB, and an "eNB which is basically operated while moving" such as a mobile relay node (mobile RN). This makes location estimation easy.

The E_PM_1 shown in Table 2 is a Network-assisted GNSS method. The E_PM_2 is a downlink positioning method. The E_PM_3 is an Enhanced cell ID method. The E_PM_4 is a method based on UE tracking information. The E_PM_5 is a method based on mobile eNB tracking information. The E_PM_6 is a method based on assisted vehicular information.

Specifically, the E_PM_1, E_PM_2, and E_PM_3 are functions similar to the UE location estimation described in Non-Patent Document 2. The E_PM_1, E_PM_2, and E_PM_3 have a function of receiving and measuring a GNSS signal for an eNB_uu/s1 being a target for location estimation and calculating the results and a function of receiving and measuring a downlink signal of other eNB and calculating the results, and perform location estimation similarly to the UE operation.

The E_PM_4 estimates an eNB_uu/s1 location with the use of the information regarding the eNB_uu/s1, such as the current and past location estimation history, in-area information, and measurement information of a UE being in a coverage of a cell of the eNB_uu/s1 being a target for location estimation. The E_PM_4 is effective in a case where a radio wave of the GNSS and a radio wave of other eNB cannot be received. The E_PM_4 is effective for an "eNB whose arrangement location can be changed but which is basically operated while being fixed".

The E_PM_5 estimates a location with the use of the location estimation results of the E_PM_1, E_PM_2, and E_PM_3 for the eNB_uu/s1 being a target for location estimation, or the information regarding the eNB_uu/s1 such as the current and past location estimation history and measurement information for the eNB_uu/s1. The information regarding the eNB_uu/s1 may include the in-area information in a case where a target for location estimation is an eNB_uu. The E_PM_5 is effective mainly for an "eNB which is basically operated while moving".

The E_PM_6 is applied to an eNB installed in a moving structure. The E_PM_6 estimates a location using the location information measured and estimated in a mobile structure such as a train operation system and a car navigation system and using the speed information.

As to eNB location estimation requests (also referred to as location service requests), a location is managed in a moving state and a location is estimated using the information of a plurality of UEs, and thus, the following three estimation requests (1) to (3) are included.

(1) A location estimation request (location service request) for estimating a current location using measurement information at a certain point of time.

(2) A location estimation request (first location update process request) for estimating one location using pieces of information in time.

(3) A location estimation request (second location update process request) for sequentially performing the measurement described in (1) above, where an operation during moving is assumed.

In the description below, the "location service request", "first location update process request", and "second location update process request" may be referred to as an "LS request", a "first LUP request", and a "second LUP request", respectively.

Basically, the first LUP request is targeted for an "eNB, whose arrangement location can be changed but which is basically operated while being fixed", and the second LUP request is targeted for an "eNB which is basically operated while moving".

Figure 8:
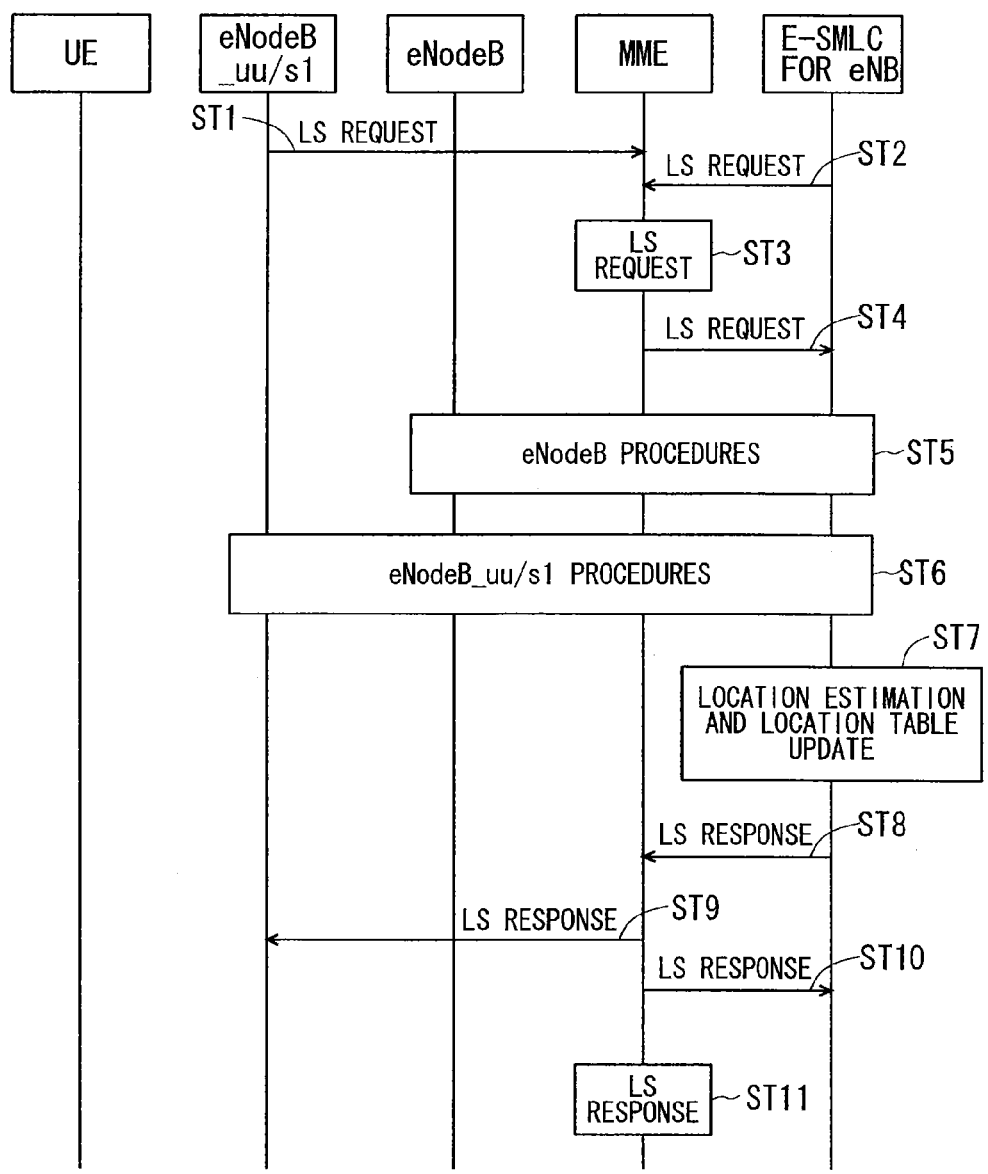
FIG. 8 is a diagram showing an exemplary sequence of an LS request.

The operation regarding the eNB location estimation will be described below. FIG. 8 is a diagram showing an exemplary sequence of an LS request. In this sequence, all the eNB positioning methods are applicable.

When a location estimation request is issued in the eNodeB_uu/s1 serving as an LCF, in Step ST1, the eNodeB_uu/s1 transmits an LS request to the MME.

When a location estimation request is issued in the E-SMLC for eNB serving as an LCF, in Step ST2, the eNodeB_uu/s1 transmits an LS request to the MME.

When a location estimation request is issued in the MME serving as an LCF, in Step ST3, the MME recognizes an LS request as an internal event to be carried out.

In Step ST4, the MME that has received the LS request or recognizes it as an internal event notifies the E-SMLC for eNB of the LS request. The processes of Steps ST1 to ST3 described above are independent of each other, and the MME performs the process of Step ST4 when an appropriate one process selected from the steps above is performed.

In Step ST5, the E-SMLC for eNB, eNodeB, and MME perform eNodeB procedures. Specifically, the E-SMLC for eNB that has received the LS request from the MME exchanges, with the eNodeB being a target for location estimation and the MME, measurement data and auxiliary data regarding location estimation as required.

After that, in Step ST6, the eNodeB uu/s1, eNodeB, MME, and E-SMLC for eNB perform eNodeB_uu/s1 procedures. Specifically, the data required for location estimation is exchanged among the eNodeB_uu/s1 being a target for location estimation, eNodeB, MME, and E-SMLC for eNB, as the eNodeB_uu/s1 procedures.

In Step ST7, the E-SMLC for eNB performs location estimation. The E-SMLC for eNB that has completed the location estimation records estimation results and the reliability calculated based on the estimation results in an eNodeB management table (hereinafter, also referred to as a "location table"), and updates the location table.

In Step ST8, the E-SMLC for eNB adds the estimated location information and transmits, to the MME, an LS response indicating the completion of the process.

The MME that has received the LS response from the E-SMLC for eNB transmits the LS response to a request source.

Specifically, in a case where the eNodeB_uu/s1 is a request source, namely in a case where the process of Step ST1 described above has been performed, in Step ST9, the MME transmits an LS response to the eNodeB_uu/s1.

In a case where the E-SMLC for eNB is a request source, namely in a case where the process of Step ST2 described above has been performed, in Step ST10, the MME transmits an LS response to the E-SMLC for eNB.

In a case where the MME itself is a request source, namely in a case where the process of Step ST3 described above has been performed, in Step ST11, the MME checks the LS response by itself.

For a low degree of reliability of the estimation results, location estimation may be performed again by another positioning method or procedure to improve accuracy.

Figure 9:
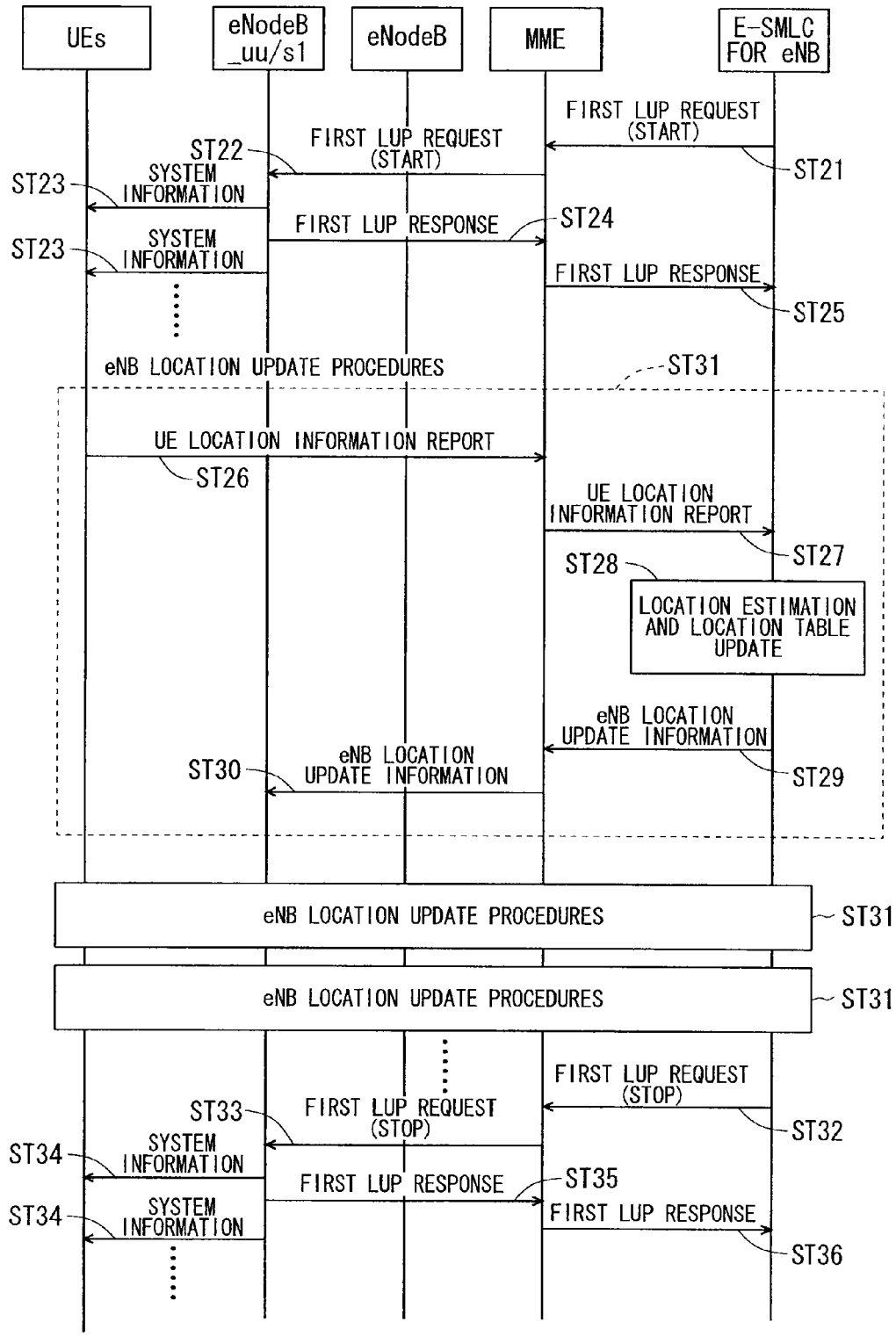
FIG. 9 is a diagram showing an exemplary sequence in a case where a method based on UE tracking information of E_PM_4 is used as a positioning method and a first LUP request is used.

FIG. 9 is a diagram showing an exemplary sequence in a case where the method based on the UE tracking information of the E_PM_4 is used as a positioning method and a first LUP request is used.

First, in the E-SMLC for eNB serving as an LCF, when a location estimation request is issued due to, for example, insufficient accuracy of the eNodeB_uu/s1 being a target for location estimation, the process moves to Step ST21.

In Step ST21, the E-SMLC for eNB transmits a first location update process (LUP) request message to the MME to notify a start of the process.

The first LUP request message can notify a start and stop of the process and a positioning method.

In Step ST22, the MME that has received the first LUP request message indicating a start of the process transmits the request message, that is, the first LUP request message indicating the start of the process to the eNodeB_uu/s1, thereby notifying a start of the process.

In Step ST23, the eNodeB uu/s1 that has received the first LUP request message indicating a start of the process checks that the positioning method is the E_PM_4 and broadcasts using, for example, the system information or notifies the UE that the own cell is a cell (hereinafter, referred to as a "cell by the method based on the UE tracking information") to be positioned by the method based on the UE tracking information of the E_PM_4. As to this notification, a specific field may be set as the system information or a field such as a closed subscriber group (CSG) may replace the system information. In a case where a CSG field is used, the information from the UE is always accepted at all the CSG cells.

As described above, the UE is notified of whether or not the own cell is a cell by the method based on the UE tracking information, so that the transmission of unnecessary information can be stopped at the cell by the method not based on the UE tracking information. Accordingly, power consumption and communication traffic of the UE can be reduced.

In Step ST24, the eNodeB_uu/s1 transmits a first LUP response message to the MME.

In Step ST25, the MME that has received the first LUP response message transmits the first LUP response message to the E-SMLC for eNB. As a result, a first LUP is activated.

While the first LUP is activated, eNB location update procedures of Step ST31, which are performed among the UE, eNodeB_uu/s1, eNodeB, MME, and E-SMLC for eNB, can be activated at an appropriate timing.

The eNB location update procedures of Step ST31 include the processes of Steps ST26 to ST30 described below.

Here, the operation of the UE is described. The UE being in the coverage of this cell first receives, for example, system information to recognize that the relevant cell is a cell by the method based on the UE tracking information. The UE that has recognized that the relevant cell is a cell by the method based on the UE tracking information measures the information regarding the estimation of a current location as required and, in Step ST26, swiftly transmits the information regarding the location estimation of the own device measured at present and in the past to the MME in a UE location information report.

The UE location information report is transmitted in Step ST26 as described above, which starts the eNB location update procedures composed of the processes of Steps ST26 to ST30 that are performed among the UE, eNodeB_uu/s1, eNodeB, MME, and E-SMLC for eNB.

In a case where a tracking area update (TAU) is performed, the information regarding location estimation can be transmitted in a manner in which the information regarding location estimation is included in the TAU procedures.

Through transmission of a UE location information report over, for example, a dedicated channel, this process is applicable not only to a UE in an RRC_Idle state but also to a UE in an RRC_Connected state.

When the information regarding location estimation is transmitted with time, an improvement in accuracy of location estimation can be anticipated. The transmission of the information regarding location estimation can be avoided through setting of a UE and network equipment.

Here, the RRC_Idle state is a standby state and the RRC_Connected state is an RRC connected state. In the RRC_Idle state, public land mobile network (PLMN) selection, broadcast of system information (SI), paging, cell re-selection, mobility, and the like are performed. In the RRC_Connected state, a user equipment has an RRC connection, is capable of transmission and reception of data to and from a network, and performs handover (HO), measurement of a neighbour cell, and the like.

In Step ST27, the MME that has received the UE location information report transmits the received information to the E-SMLC for eNB as the UE location information report between the MME and E-SMLC for eNB.

In Step ST28, the E-SMLC for eNB that has received the UE location information report performs location estimation with the use of, for example, the UE location information included in the UE location information report and the information and location estimation results of the UE that have been received. The E-SMLC for eNB that has completed location estimation records the estimation results and the reliability calculated based on the estimation results in a location table being an eNodeB management table, to thereby update the location table.

In Step ST29, the E-SMLC for eNB transmits the updated location information and the related information to the MME as the eNB location update information.

In Step ST30, the MME that has received the eNB location update information transmits the received information to the eNB_uu/s1 as the eNB location update information between the MME and eNB_uu/s1.

A plurality of different UEs or the same UE repeats the process of the eNB location update procedures of Step ST31.

If a stop request is issued due to sufficient accuracy obtained at the E-SMLC for eNB, the process moves to Step ST32.

In Step ST32, the E-SMLC for eNB transmits a first LUP request message indicating a stop of the process to the MME, to thereby notify a stop of the process.

In Step ST33, the MME that has received the first LUP request message indicating a stop of the process transmits the first LUP request message indicating a stop of the process to the eNB_uu/s1, to thereby notify a stop of the process.

In Step ST34, the eNodeB_uu/s1 that has received the first LUP request indicating a stop of the process broadcasts the first LUP request message using the system information or notifies the UE that the own cell is not a cell by the method based on the UE tracking information over a dedicated channel.

In Step ST35, the eNodeB_uu/s1 transmits a first LUP response message to the MME. In Step ST36, the MME that has received the first LUP response message transmits the first LUP response to the E-SMLC for eNB.

Figure 10:
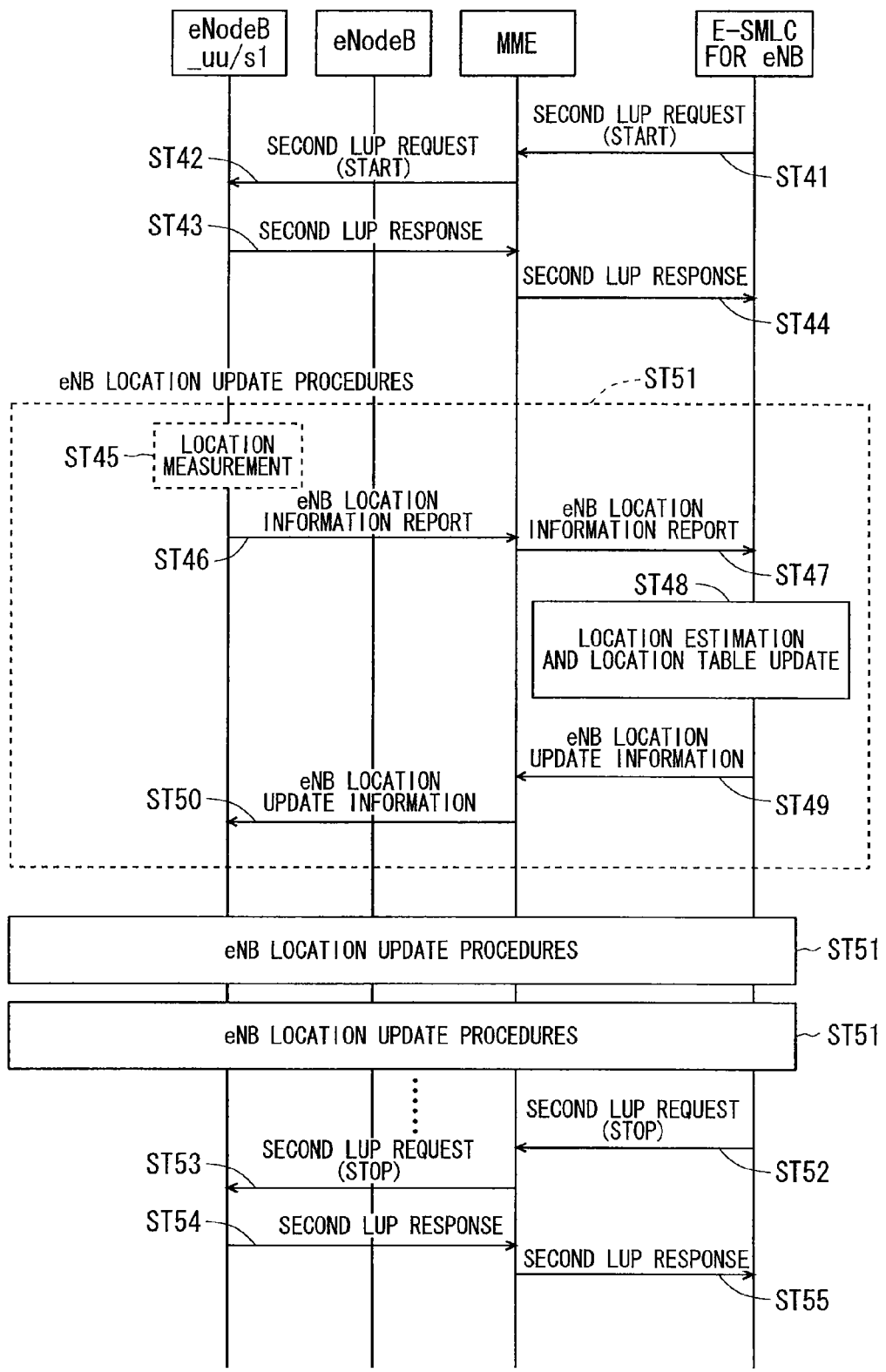
FIG. 10 is a diagram showing an exemplary sequence in a case where a method based on mobile eNB tracking information of E_PM_5 is used as a positioning method and a second LUP request is used.

FIG. 10 is a diagram showing an exemplary sequence in a case where the method based on the mobile eNB tracking information of the E_PM_5 is used as the positioning method and the second LUP request is used.

First, when a location estimation request using the positioning method and the second LUP request is issued for the reason that an eNB being a location estimation target is installed in a mobile structure such as a train in the E-SMLC for eNB serving as an LCF, the process moves to Step ST41.

In Step ST41, the E-SMLC for eNB transmits a second LUP request message indicating a start of the process to the MME, to thereby notify a start of the process.

The second LUP request message can notify, for example, the start and stop of the process and a positioning method.

In Step ST42, the MME that has received the second LUP request message indicating a start of the process transmits that message, namely a second LUP request message indicating a start of the process to the eNodeB_uu/s1 being a target for location estimation, to thereby notify a start of the process.

The eNodeB_uu/s1 that has received the second LUP request message indicating a start of the process checks that the positioning method is the E_PM_5 and, in Step ST43, transmits a second LUP response message to the MME.

In Step ST44, the MME that has received the second LUP response message transmits the received information to the E-SMLC for eNB as a second LUP response message between the MME and E-SMLC for eNB. As a result, a second LUP is activated.

While the second LUP is activated, the eNB location update procedures of Step ST51, which are performed among the eNodeB_uu/s1, eNodeB, MME, and E-SMLC for eNB, can be activated at an appropriate timing.

The eNB location update procedures of Step ST51 include the processes of Steps ST45 to ST50 described below.

In Step ST45, the eNodeB_uu/s1 starts measuring and calculating the information regarding regular or irregular location estimation.

In Step ST46, the eNodeB_uu/s1 regularly or irregularly transmits the information regarding location estimation to the MME in an eNB location information report. The information measured and calculated by the eNodeB_uu/s1 and is transmitted to the MME relates to, for example, the E_PM_1, E_PM_2, and E_PM_3 shown in Table 2.

In Step ST47, the MME that has received the eNB location information report transmits the received information to the E-SMLC for eNB as the eNB location information report between the MME and E-SMLC for eNB.

In Step ST48, the E-SMLC for eNB that has received the eNB location information report performs location estimation using, for example, the eNB location information contained in the eNB location information report, the route map of the mobile structure, and the eNB installation location information. The E-SMLC for eNB that has completed the location estimation records the estimation results and the reliability calculated based on the estimation results in a location table being an eNodeB management table, to thereby update the location table.

In Step ST49, the E-SMLC for eNB transmits the updated location information and the information related thereto to the MME as the eNB location update information.

In Step ST50, the MME that has received the eNB location update information transmits the received information to the eNB_uu/s1 as the eNB location update information between the MME and eNB_uu/s1.

The process of the eNB location update procedures of Step ST51 are repeated.

The process moves to Step ST52 in a case where a stop request is issued due to, for example, sufficient accuracy obtained in the E-SMLC for eNB.

In Step ST52, the E-SMLC for eNB notifies the MME of a second LUP request message indicating a stop of the process.

In Step ST53, the MME that has received the second LUP request message indicating a stop of the process transmits a second LUP request message indicating a stop of the process to the eNodeB_uu/s1, to thereby notify a stop of the process.

In Step ST54, the eNodeB_uu/s1 that has received the second LUP request message indicating a stop of the process transmits a second LUP response message to the MME. In Step ST55, the MME that has received the second LUP response message transmits the second LUP response message to the E-SMLC for eNB.

Figure 11:
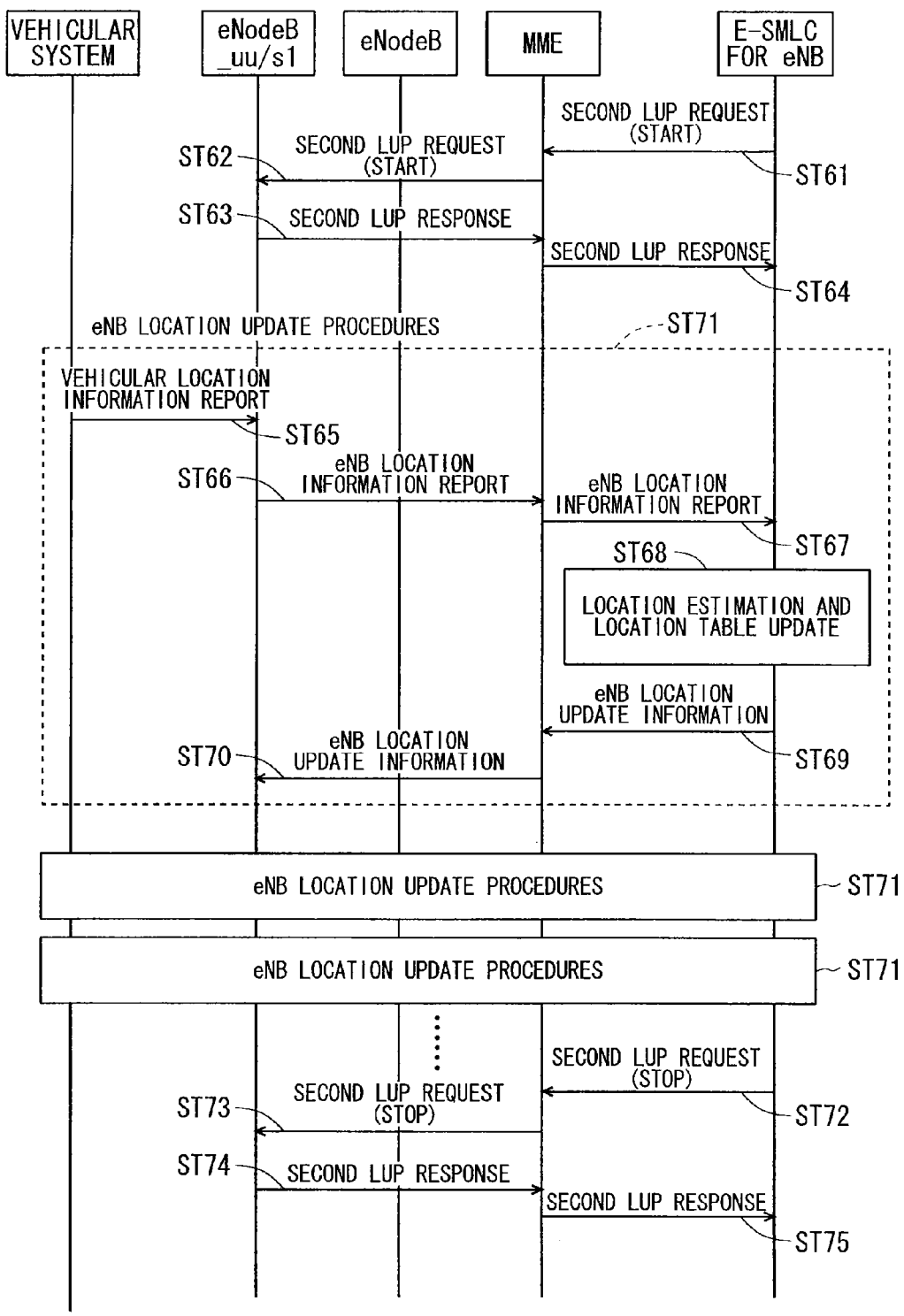
FIG. 11 is a diagram showing an exemplary sequence in a case where a method based on assisted vehicular information of E_PM_6 is used as a positioning method and the second LUP request is used.

FIG. 11 is a diagram showing an exemplary sequence in a case where the method based on the assisted vehicular information of the E_PM_6 is used as a positioning method and also the second LUP request is used.

First, an eNB being a location estimation target is installed in a mobile structure such as a train in the E-SMLC for eNB serving as the LCF, and when a location estimation request using this positioning method and second LUP request is issued for the reason that the information regarding location estimation can be obtained from the vehicular system of the mobile structure, the process moves to Step ST61.

In Step ST61, the E-SMLC for eNB transmits a second LUP request message indicating a start of the process to the MME, to thereby notify a start of the process.

In Step ST62, the MME that has received the second LUP request message indicating a start of the process notifies the eNodeB_uu/s1 being a location estimation target of the second LUP request message indicating a start of the process.

The eNodeB_uu/s1 that has received the second LUP request message indicating a start of the process checks that the positioning method is the E_PM_6 and, in Step ST63, transmits a second LUP response message to the MME.

In Step ST64, the MME that has received the second LUP response message transmits the received information to the E-SMLC for eNB as a second LUP response message between the MME and E-SMLC for eNB. This results in the activation of the second LUP.

During the activation of the second LUP, the eNB location update procedures of Step ST71, which are performed among the vehicular system, eNodeB_uu/s1, eNodeB, MME, and E-SMLC for eNB, can be activated at an appropriate timing.

The eNB location update procedures of Step ST71 include the processes of Steps ST65 to ST70 described below.

In Step ST65, the vehicular system regularly or irregularly transmits the information regarding location estimation to the eNodeB_uu/s1 as a vehicular location information report. The eNodeB_uu/s1 that has received the vehicular location information report performs a computation for the information regarding location estimation regularly or irregularly received from the vehicular system. In Step ST66, then, the eNodeB_uu/s1 regularly or irregularly transmits the information regarding location estimation to the MME in an eNB location information report.

In Step ST67, the MME that has received the eNB location information report transmits the received information to the E-SMLC for eNB as an eNB location information report between the MME and E-SMLC for eNB. In other words, the MME forwards the received eNB location information to the E-SMLC for eNB.

In Step ST68, the E-SMLC for eNB that has received the eNB location information report performs location estimation using, for example, the eNB location information contained in the eNB location information report, the route map of the mobile structure, and the installation location information of the eNB. The E-SMLC for eNB that has completed the location estimation records the estimation results and the reliability calculated based on the estimation results in a location table being an eNodeB management table, to thereby update the location table.

In Step ST69, the E-SMLC for eNB transmits eNB location update information to the MME.

In Step ST70, the MME that has received the eNB location update information transmits the received information to the eNB_uu/s1 as eNB location update information between the MME and eNB_uu/s1.

The process of the eNB location update procedures of Step ST71 are repeated. The process moves to Step ST72 in a case where a stop request is issued due to the accuracy sufficient for location estimation that has been obtained in the E-SMLC for eNB.

In Step ST72, the E-SMLC for eNB transmits a second LUP request message indicating a stop of the process to the MME, to thereby notify a stop of the process.

In Step ST73, the MME that has received the second LUP request message indicating a stop of the process transmits a second LUP request message indicating a stop of the process to the eNodeB_uu/s1, to thereby notify a stop of the process.

In Step ST74, the eNodeB_uu/s1 that has received the second LUP request message indicating a stop of the process transmits a second LUP response message to the MME. In Step ST75, the MME that has received the second LUP response message transmits the received information to the E-SMLC for eNB as a second LUP response message between the MME and E-SMLC for eNB.

Description will be given below of the operation regarding the location estimation of the UE that is performed using the location estimation results of a movable eNB.

Figure 13:
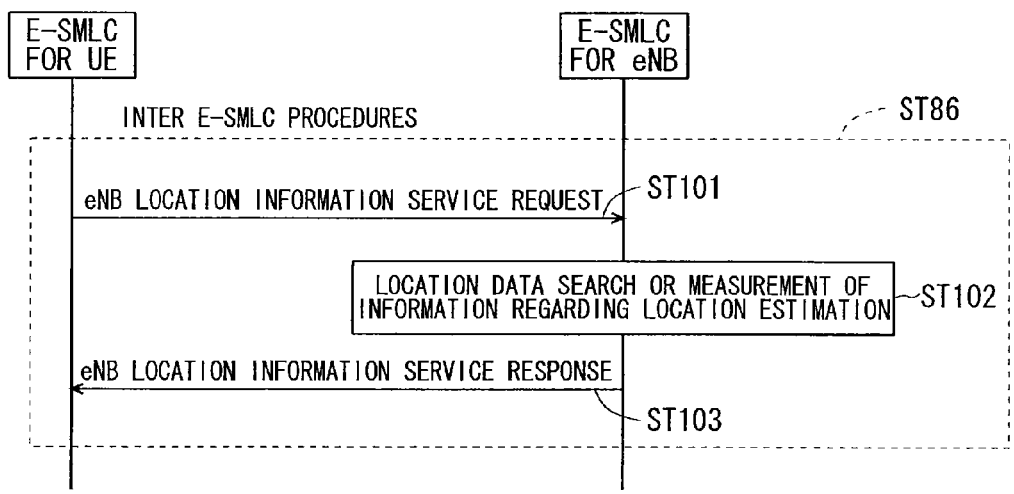
FIG. 13 is a diagram showing an exemplary sequence of inter E-SMLC procedures of Step ST86 shown in FIG. 12.

FIG. 12 is a diagram showing an exemplary sequence when location estimation of a UE is performed using the location estimation results of a movable eNB. FIG. 12 is a diagram showing an exemplary sequence obtained by adding the procedures of using the location estimation results of a movable eNB to the sequence disclosed in 5.1-1 of Non-Patent Document 2 (3GPP TS36.305). FIG. 13 is a diagram showing an exemplary sequence of the inter E-SMLC procedures of Step ST86 shown in FIG. 12.

When a location estimation request is issued in the UE serving as an LCF, in Step ST81, the UE transmits an LS request to the MME.

When a location estimation request is issued in the external LCS client serving as an LCF, in Step ST82, the external LCS client transmits an LS request to the MME.

When a location estimation request is issued in the MME serving as an LCF, in Step ST83, the MME recognizes the LS request as an internal event to be carried out.

When the location estimation request is issued in the E-SMLC for eNB serving as an LCF, in Step ST84, the E-SMLC for eNB transmits an LS request to the MME.

In Step ST85, the MME that has received the LS request or recognized it as an internal event notifies the E-SMLC for UE of the LS request. The mentioned processes of Steps ST81 to ST84 are independent of each other, and the MME performs the process of Step ST85 when any one of the processes selected from the above-mentioned steps is performed.

The E-SMLC for UE that has received the LS request message judges whether or not the "location estimation results of a movable eNB" is required, from the information as to, for example, whether or not a serving cell or neighbor cells include a movable eNB, with the LS request of a location estimation target. In a case where it is judged that the "location estimation results of a movable eNB" are necessary, in Step ST86, the E-SMLC for UE and E-SMLC for eNB perform the inter E-SMLC procedures. Specifically, the E-SMLC for UE queries the E-SMLC for eNB about the location information of the target eNB.

In the inter E-SMLC procedures, in Step ST101 shown in FIG. 13, the E-SMLC for UE transmits an eNB location information service request to the E-SMLC for eNB.

In Step ST102, the E-SMLC for eNB searches location data or measures the information regarding location estimation of a target eNB.

In Step ST103, the E-SMLC for eNB transmits an eNB location information service response to the E-SMLC for UE.

After that, the process returns to the sequence shown in FIG. 12 and, in Step ST87, the eNodeB, MME, and E-SMLC for UE perform eNodeB procedures. In the eNodeB procedures, the measurement data regarding location estimation and auxiliary data are exchanged among the eNodeB, MME, and E-SMLC for UE.

After that, in Step ST88, the UE, eNodeB, MME, and E-SMLC for UE perform UE procedures. In the UE procedures, the data required for the target UE and location estimation is exchanged among the UE, eNodeB, MME, and E-SMLC for UE. Then, the E-SMLC for UE performs location estimation.

In Step ST89, the E-SMLC for UE that has completed location estimation makes the estimation results and the reliability, which is calculated based on the estimation results, added to the estimated location information as required, and included in an LS response, and then transmits the LS response to the MME.

The MME that has received the LS response transmits an LS response to a request source. Specifically, in a case where the UE is a request source, that is, in a case where the process of Step ST81 described above has been performed, in Step ST90, the MME transmits an LS response to the UE.

In a case where the external LCS client is a request source, that is, in a case where the process of Step ST82 described above is performed, in Step ST91, the MME transmits an LS response to the external LCS client.

In a case where the MME is a request source per se, that is, in a case where the process of Step ST83 described above has been performed, in Step ST92, the MME checks the LS response by itself.

In a case where the E-SMLC for eNB is a request source, that is, in a case where the process of Step ST84 described above is performed, in Step ST93, the MME transmits an LS response to the E-SMLC for eNB.

FIGS. 14 and 15 are diagrams showing exemplary sequences in a case where the timing at which the inter E-SMLC procedures are performed is different from that of FIG. 12. FIG. 14 shows the sequence in a case where the inter E-SMLC procedures are performed along with the eNodeB procedures, whereas FIG. 15 shows the sequence in a case where the inter E-SMLC procedures are performed along with the UE procedures. These are the sequence for a case where the "location estimation results of a movable eNB" are necessary in the respective procedures.

The processes of Steps ST111 to ST115 and ST117 to ST122 of FIG. 14 are similar to the processes of Steps ST81 to ST85 and ST88 to ST93 of FIG. 12, and thus, common description will be omitted.

In the sequence shown in FIG. 14, in Step ST116, the eNodeB, MME, E-SMLC for UE, and E-SMLC for eNB perform eNodeB procedures.

The processes of Steps ST131 to ST135, ST136, and ST138 to ST142 shown in FIG. 15 are similar to the processes of Steps ST81 to ST85, ST87, and ST89 to ST93 shown in FIG. 12, and thus, common description will be omitted.

With reference to FIG. 15, in Step ST137, the UE, eNodeB, MME, E-SMLC for UE, and E-SMLC for eNB perform the UE procedures.

Through the above, location estimation of a movable eNB is allowed. Also, with the use of the estimation results of the location of a movable base station in location estimation of a UE, location estimation is allowed for a UE being in a coverage of a movable base station and a UE having been in a coverage of a movable base station recently, allowing for enlargement of a UE location estimation area and an improvement in accuracy of UE location estimation as an entire network.

Figure 16:
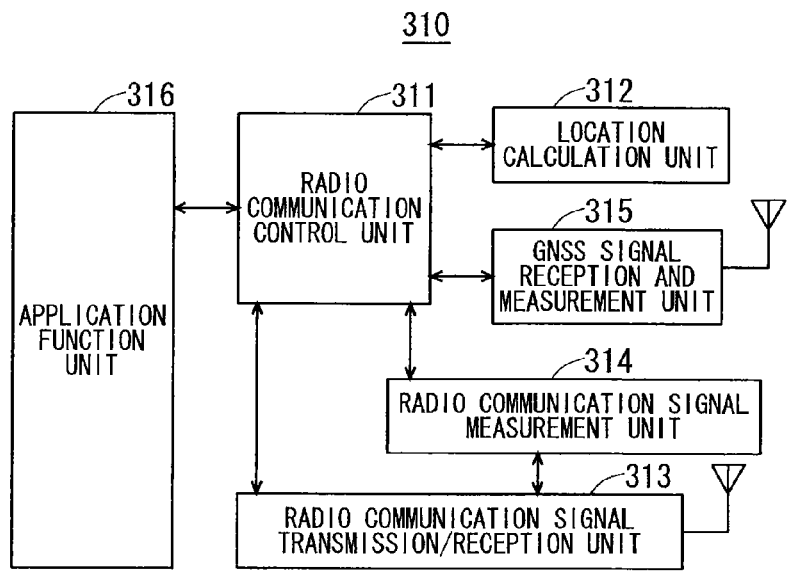
FIG. 16 is a block diagram showing a configuration of a UE in the first embodiment of the present invention.

FIG. 16 is a block diagram showing a configuration of a UE in the first embodiment of the present invention. A UE 310 includes a radio communication control unit 311, a location calculation unit 312, a radio communication signal transmission/reception unit 313, a radio communication signal measurement unit 314, a GNSS signal reception and measurement unit 315, and an application function unit 316.

The radio communication control unit 311 controls a communication protocol and manages devices for radio communication. The radio communication control unit 311 has the PRRM function. The location calculation unit 312 has a PCF and performs a calculation as to the location estimation of the UE and eNB.

The radio communication signal transmission/reception unit 313 performs, for example, modulation and demodulation for transmission/reception of radio communication signals, channel coding, and frequency conversion. The radio communication signal measurement unit 314 has a PSMF for radio communication signals.

The GNSS signal reception and measurement unit 315 has a PSMF for GNSS signals. The application function unit 316 functions as a user interface and performs an application process.

Figure 17:
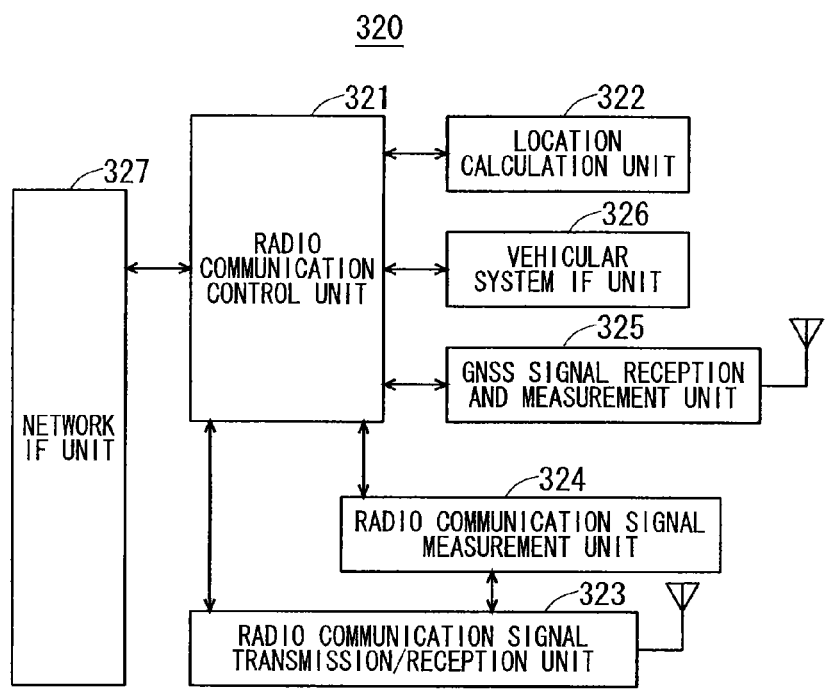
FIG. 17 is a block diagram showing a configuration of an eNB_uu/s1 320 in the first embodiment of the present invention.

FIG. 17 is a block diagram showing a configuration of an eNB_uu/s1 320 in the first embodiment of the present invention. The eNB_uu/s1 320 includes a radio communication control unit 321, a location calculation unit 322, a radio communication signal transmission/reception unit 323, a radio communication signal measurement unit 324, a GNSS signal reception and measurement unit 325, a vehicular system IF unit 326, and a network IF unit 327.

The radio communication control unit 321 controls a communication protocol and manages devices for radio communication. The radio communication control unit 321 has the PRRM function. The location calculation unit 322 has a PCF and performs a calculation as to the location estimation of the UE and eNB.

The radio communication signal transmission/reception unit 323 performs, for example, modulation and demodulation for transmission/reception of radio communication signals, channel coding, and frequency conversion. The radio communication signal measurement unit 324 has a PSMF for radio communication signals.

The GNSS signal reception and measurement unit 325 has a PSMF for GNSS signals. The vehicular system IF unit 326 has a user interface function for communication with the vehicular system. The network IF unit 327 has an interface function for communication with the vehicular system IF unit 326, MME, and the like.

Figure 18:
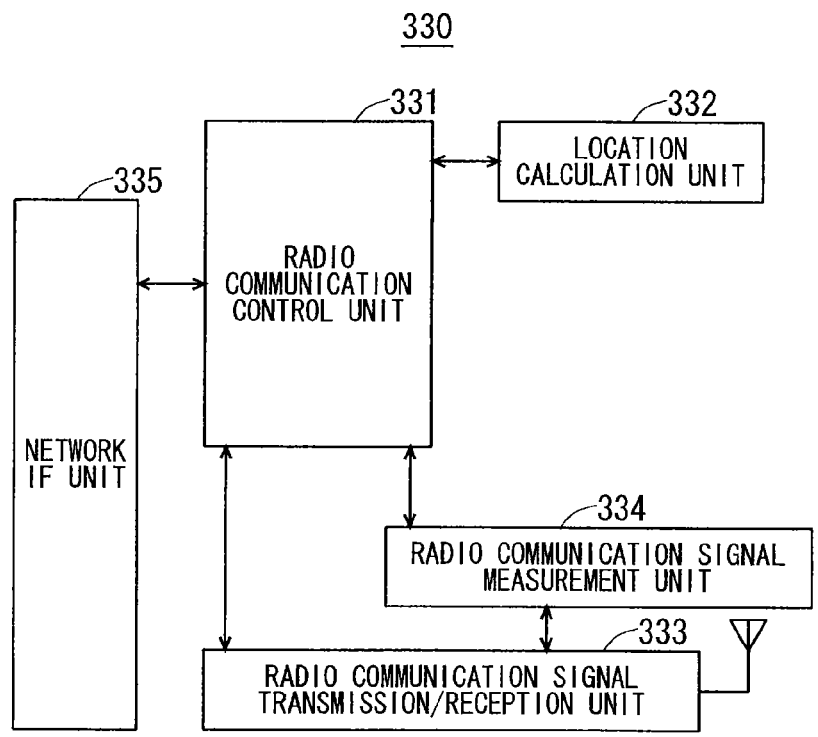
FIG. 18 is a block diagram showing a configuration of an eNB 330 in the first embodiment of the present invention.

FIG. 18 is a block diagram showing a configuration of an eNB 330 in the first embodiment of the present invention. The eNB 330 includes a radio communication control unit 331, a location calculation unit 332, a radio communication signal transmission/reception unit 333, a radio communication signal measurement unit 334, and a network IF unit 335.

The radio communication control unit 331 controls a communication protocol and manages devices for radio communication. The radio communication control unit 331 has the PRRM function. The location calculation unit 332 has a PCF and performs a calculation as to the location estimation of the UE and eNB.

The radio communication signal transmission/reception unit 333 performs, for example, modulation and demodulation for transmission/reception of radio communication signals, channel coding, and frequency conversion. The radio communication signal measurement unit 334 has a PSMF for radio communication signals. The network IF unit 335 has an interface function for communication with the MME and the like.

Figure 19:
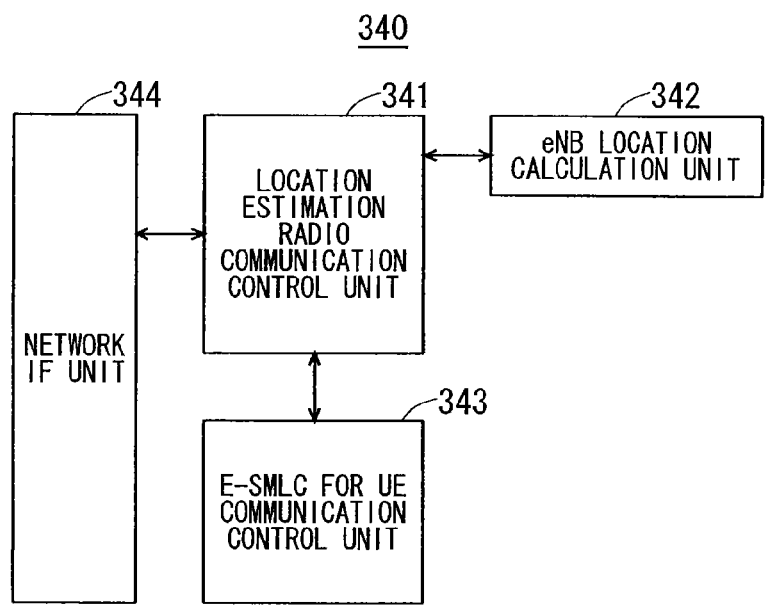
FIG. 19 is a block diagram showing a configuration of an E-SMLC for eNB 340 in the first embodiment of the present invention.

FIG. 19 is a block diagram showing a configuration of an E-SMLC for eNB 340 in the first embodiment of the present invention. The E-SMLC for eNB 340 includes a location estimation radio communication control unit 341, an eNB location calculation unit 342, an E-SMLC for UE communication control unit 343, and a network IF unit 344.

The location estimation radio communication control unit 341 has a radio communication protocol control function (PRCF) and a device management function for location estimation of an eNB. The eNB location calculation unit 342 has a PCF for an eNB. The E-SMLC for UE communication control unit 343 controls communication with the E-SMLC for UE. The network IF unit 344 has an interface function for communication with the MME and the like.

Figure 20:
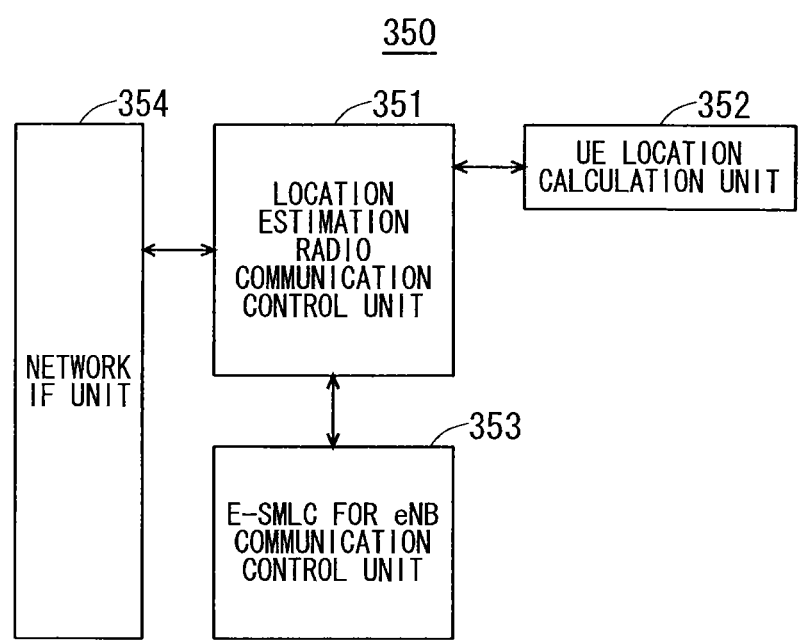
FIG. 20 is a block diagram showing a configuration of an E-SMLC for UE 350 in the first embodiment of the present invention.

FIG. 20 is a block diagram showing a configuration of an E-SMLC for UE 350 in the first embodiment of the present invention. The E-SMLC for UE 350 includes a location estimation radio communication control unit 351, a UE location calculation unit 352, an E-SMLC for eNB communication control unit 353, and a network IF unit 354.

The location estimation radio communication control unit 351 has a radio communication protocol control function (PRCF) and a device management function for location estimation of the UE. The UE location calculation unit 352 has a PCF for a UE. The E-SMLC for eNB communication control unit 353 controls communication with the E-SMLC for eNB. The network IF unit 354 has an interface function for communication with the MME and the like.

As described above, in the present embodiment, the E-SMLC for eNB being a management device performs a measurement and a calculation for estimating base station location information being the information regarding a base station location and functions as location estimation processing unit that estimates base station location information. The management device including the E-SMLC for eNB performs various processes based on the base station location information regarding the base station location estimated by the E-SMLC for eNB.

The processes by the management device include at least one of the processes of radio communication control in communication between a user equipment (UE) and a base station, control of a communication call, management of moving of a user equipment, management of a radio communication system, and management of location information of devices constituting the radio communication system. The devices constituting the radio communication system include a user equipment and a base station device.

As described above, in the present embodiment, the function of location estimation processing unit that performs a measurement and a calculation for estimating base station location information to estimate the base station location information is installed in the radio communication system.

The location estimation processing unit obtains "various measurement information for performing location estimation or information obtained by processing the measurement information" through the above-mentioned measurement and calculation and, as the base station location information, uses the information to estimate "information indicative of an estimated location as a result of location estimation".

The above-mentioned information is referred to as "information regarding location estimation of a base station" below. In other words, the information regarding location estimation of a base station includes both of the "various measurement information for performing location estimation or information obtained by processing the measurement information" and the "information indicative of an estimated location as a result of location estimation". The information regarding location estimation of a base station includes the measurement information of a radio network by the base station per se, measurement history information and in-coverage cell history information of a user equipment, neighbour cell measurement history information of a base station per se, information regarding current location estimation of a mobile structure in which the base station is installed, such as the information regarding current location estimation in a car navigation system and train service information.

A base station location estimation system that aggregates and manages these pieces of information regarding location estimation of a base station is constructed, and is brought into association with a location estimation system of a user equipment as required, to thereby estimate the information regarding a location such as the location and moving speed of the base station. The estimation results are provided to the location estimation system of a user equipment, to thereby estimate the information regarding a location such as the location and moving speed of the user equipment.

The part that functions as a base station location estimation system of a radio communication system estimates the location of a base station using the history information and the information regarding location estimation of a base station such as the information from a part that functions as another system such as a user equipment location estimation system. This allows for estimation of the information regarding a location such as the location and moving speed of the base station in various situations such as a case in which the information for location estimation cannot be obtained from the outside and a case in which the base station is assumed to be constantly moving.

For example, the history information of a user equipment is used as the information regarding location estimation of a base station for estimating the base station location information of the base station in a situation in which the information for location estimation cannot be obtained from the outside with the base station being almost at rest, such as a femtocell base station. The user equipment can be basically assumed to move without interruption, and thus, the use of the history information of the user equipment allows for estimation of the base station location as the base station location information.

For estimation of the base station location information of a base station assumed to be constantly moving, such as a mobile radio relay station, the neighbour cell measurement history information of the base station per se or the information regarding the current location estimation of a mobile structure is used. This allows for location estimation of a base station as the base station location information.

In the present embodiment, the base station is installed in a mobile structure being a movable structure such as an automobile or a car of a train, and moves together with the mobile structure. The base station location estimation unit obtains the mobile structure location information regarding a mobile structure location from a mobile structure or a mobile structure management system that manages the mobile structure, such as a car navigation system or a train management system, and estimates the base station location information based on the obtained mobile structure location information. This allows for easier estimation of base station location information.

In the present embodiment, the E-SMLC for eNB being a management device manages the base stations through classification into any of the following three types: (a) a fixed base station device installed in a fixed manner and is operated while being fixed, (b) a movable base station device installed in a movable manner and operated while being fixed, and (c) a mobile base station device installed in a movable manner and operated while moving. The base station location estimation unit estimates the base station location information based on this classification by the management device. This can prevent the execution of an unnecessary process, such as the execution of a location estimation process for a fixed base station device that is operated while being fixed. This allows the process of estimating the base station location information to be performed more efficiently.

Second Embodiment

Next, a second embodiment of the present invention will be described. The present embodiment will describe a case in which the present invention is applied to a movable NodeB belonging to a UTRAN.

Figure 21:
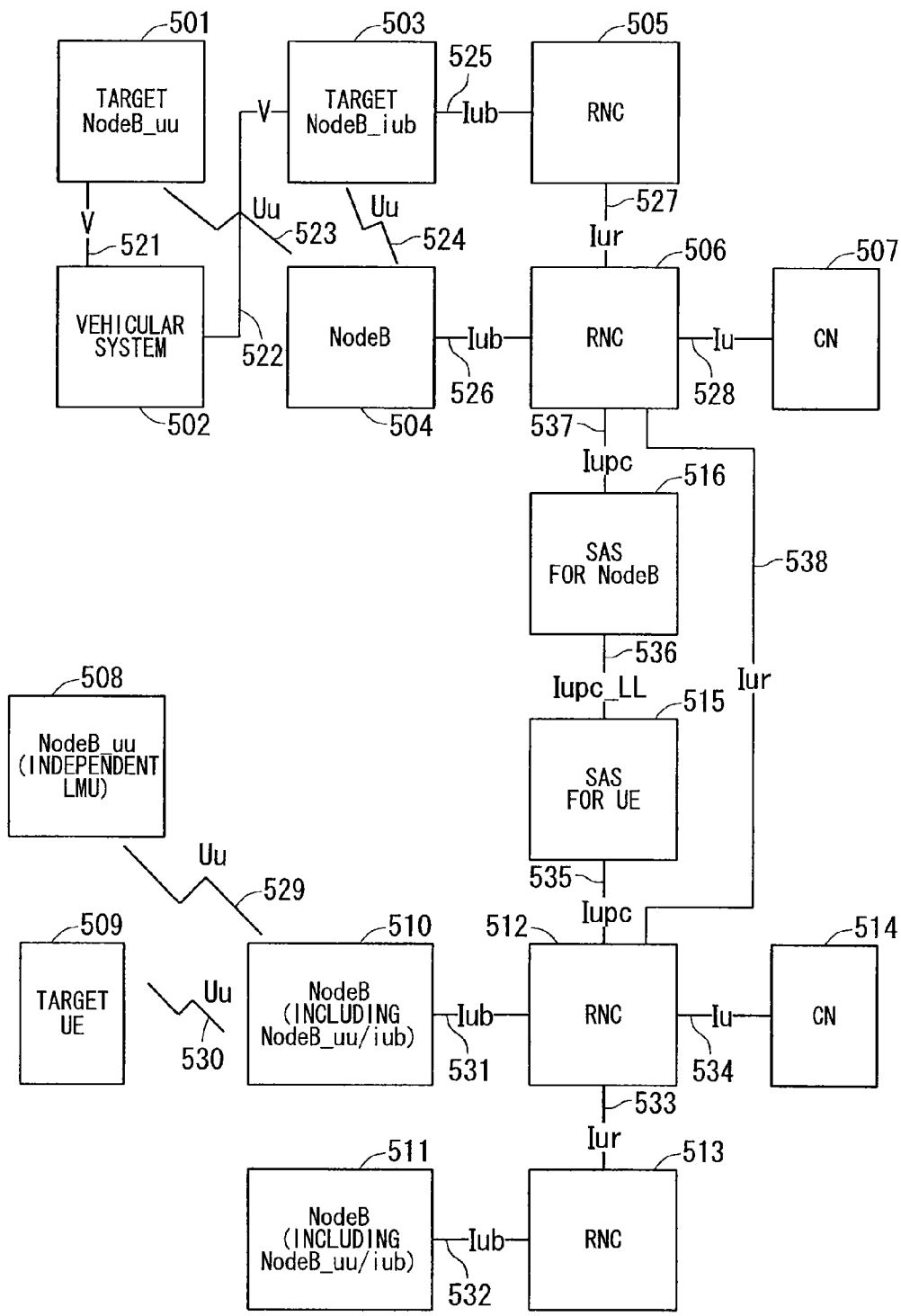
FIG. 21 is a block diagram showing a configuration of a radio communication system 500 in a second embodiment of the present invention.

FIG. 21 is a block diagram showing a configuration of a radio communication system 500 in the second embodiment of the present invention.

The radio communication system 500 includes a target NodeB_uu 501, a vehicular system 502, a target NodeB_iub 503, a NodeB 504, a first radio network controller (RNC) 505, a second RNC 506, a first core network (CN) 507, a NodeB_uu (independent LMU) 508, a target UE 509, a first NodeB 510, a second NodeB 511, a third RNC 512, a fourth RNC 513, a second CN 514, an SAS for UE 515, and an SAS for NodeB 516.

The target NodeB_uu 501 and vehicular system 502 are connected by a V interface 521. The vehicular system 502 and target NodeB_iub 503 are connected by a V interface 522. The target NodeB_uu 501 and NodeB 504 are connected by a Uu interface 523. The target NodeB_iub 503 and NodeB 504 are connected by a Uu interface 524.

The target NodeB_iub 503 and first RNC 505 are connected by an Iub interface 525. The NodeB 504 and second RNC 506 are connected by an Iub interface 526. The first RNC 505 and second RNC 506 are connected by an Iur interface 527. The second RNC 506 and first CN 507 are connected by an Iu interface 528.

The NodeB_uu 508 and first NodeB 510 are connected by a Uu interface 529. The target UE 509 and first NodeB 510 are connected by a Uu interface 530. The first NodeB 510 and third RNC 512 are connected by an Iub interface 531.

The second NodeB 511 and fourth RNC 513 are connected by an Iub interface 532. The third RNC 512 and fourth RNC 513 are connected by an Iur interface 533. The third RNC 512 and second CN 514 are connected by an Iu interface 534.

The third RNC 512 and SAS for UE 515 are connected by an Iupc interface 535. The SAS for UE 515 and SAS for NodeB 516 are connected by an Iupc_LL interface 536. The SAS for NodeB 516 and second RNC 506 are connected by an Iupc interface 537. The second RNC 506 and third RNC 512 are connected by an Iur interface 538.

In the configuration shown in FIG. 21, an independent SMLC being a conventional SAS for UE location estimation is taken as an SAS for UE, and an SAS for NB is newly provided as an SAS for eNodeB.

The SAS for NodeB 516 is an entity that manages and calculates the location information of the NodeB in the UTRAN. In a case where an SAS is considered to be included in the RNC, a certain RNC includes an entity that manages and calculates the location information of the NodeB.

As a movable NodeB, a NodeB wirelessly connected with an interface with the network side, such as a mobile relay node, specifically, a Uu interface is taken as NodeB_uu. A NodeB to be in wired connection with the Iub interface, such as a femtocell base station (HNB), is taken as eNodeB_iub.

In a case where the RNC serves to manage and calculate the location information, communication is performed using an Iur interface.

As in the first embodiment described above, the vehicular system 502 is a device capable of measuring and estimating, in a case where a NodeB is installed in a structure that is assumed to move, such as a train and automobile, the information regarding the location estimation such as the location and moving speed of the structure.

The configuration shown in FIG. 21 is a logical configuration and does not show that, for example, an SAS for NB and an SAS for UE are devices physically independent of each other.

Table 3 shows examples of the functions regarding the location estimation of the logical blocks shown in FIG. 21.

Similarly to the location estimation functions 551, the PRCF for NB, PCF for NB, PSMF for NB, PRRM for NB, LCF for NB, LSCF for NB, LSBF for NB, LSOF for NB, LSBcF for NB, LSCTF for NB, and LIMS-IWF for NB among the handling functions 553 are aimed for NB location estimation, and the contents thereof are similar to the functions described in Chapters 5 and 6 of Non-Patent Document 1.

As indicated by "○" in Table 3, the PCF and PSMF in the location estimation functions 551 for the NB are arranged in the NB, NB_uu/iub, UE, vehicular system, and RNC/SAS (positioning function for UE). The PRRM and PRCF in the

TABLE 3

|     |                | Vehicular system | UE | UTRAN NB_uu/iub | NB | RNC/SAS (positioning function for UE) | RNC/SAS (positioning function for NB) |
|-----|----------------|------------------|--------|------------------------|------------------------|---------------------------------------|---------------------------------------|
| 551 | PRCF for UE    |                  |        |                        |                        | ○                                     |                                       |
|     | PCF for UE     |                  | ○      | ○                      | ○                      | ○                                     |                                       |
|     | PSMF for UE    |                  | ○      | ○                      | ○                      |                                       |                                       |
|     | PRRM for UE    |                  |        |                        |                        | ○                                     |                                       |
|     | PRCF for NB    |                  |        |                        |                        |                                       | ○                                     |
|     | PCF for NB     | ○(PM_6)          | ○(PM_4)| ○                      | ○                      |                                       | ○                                     |
|     | PSMF for NB    | ○(PM_6)          | ○(PM_4)| ○(PM_1, 2_1, 2_2, 3, 4, 5) | ○(PM_1, 2_1, 2_2, 3, 5) |                                |                                       |
|     | PRRM for NB    |                  |        |                        |                        |                                       | ○                                     |
| 552 | LCF for UE     |                  | ○      |                        |                        | ○                                     | ○                                     |
|     | LCF for NB     |                  |        | ○                      |                        |                                       | ○                                     |
| 553 | LSCF for UE    |                  |        |                        |                        | ○                                     |                                       |
|     | LSBF for UE    |                  |        |                        |                        |                                       |                                       |
|     | LSOF for UE    |                  | ○      | ○                      | ○                      |                                       |                                       |
|     | LSBcF for UE   |                  |        |                        |                        | ○                                     |                                       |
|     | LSCTF for UE   |                  |        |                        |                        |                                       |                                       |
|     | LIMS-IWF for UE|                  |        |                        |                        |                                       |                                       |
|     | LSCF for NB    |                  |        |                        |                        |                                       | ○                                     |
|     | LSBF for NB    |                  |        |                        |                        |                                       |                                       |
|     | LSOF for NB    |                  |        | ○                      | ○                      |                                       |                                       |
|     | LSBcF for NB   |                  |        |                        |                        |                                       | ○                                     |
|     | LSCTF for NB   |                  |        |                        |                        |                                       |                                       |
|     | LIMS-IWF for NB|                  |        |                        |                        |                                       |                                       |

In Table 3, as in Table 1, location estimation functions 551 include a PRCF for UE, PCF for UE, PSMF for UE, PRRM for UE, PRCF for NB, PCF for NB, PSMF for NB, and PRRM for NB.

Among the location estimation functions 551, the PRCF for UE, PCF for UE, PSMF for UE, and PRRM for UE correspond to the PRCF, PCF, PSMF, and PRRM described in Chapters 5 and 6 of Non-Patent Document 1.

Among the location estimation functions 551, the PRCF for NB, PCF for NB, PSMF for NB, and PRRM for NB are aimed for NB location estimation, and the contents thereof are similar to the functions described in Chapters 5 and 6 of Non-Patent Document 1.

Location client functions 552 include an LCF for UE and an LCF for eNB. System handling functions 553 include an LSCF for UE, LSBF for UE, LSOF for UE, LSBcF for UE, LSCTF for UE, LIMS-IWF for UE, PRCF for NB, PCF for NB, PSMF for NB, PRRM for NB, LCF for NB, LSCF for NB, LSBF for NB, LSOF for NB, LSBcF for NB, LSCTF for NB, and LIMS-IWF for NB.

Similarly, the LCF for UE of the location client functions 552 and the LSCF for UE, LSBF for UE, LSOF for UE, LSBcF for UE, LSCTF for UE, and LIMS-IWF for UE among the system handling functions 553 correspond to the LCF, LSCF, LSBF, LSOF, LSBcF, LSCTF, and LIMS-IWF described in Chapters 5 and 6 of Non-Patent Document 1.

location estimation functions 551 are arranged in the RNC/SAS (positioning function for NB).

Here, the PSMF in the NB_uu/s1 is for GNSS signals and other NB signals, and is applied to the cases in which the PM_1, PM_2_1, PM_2_2, PM_3, PM_4, and PM_5 are used as the positioning method.

The PCF and PSMF in the UE function similarly to the UE location estimation, and used in the case where the PM_4 is used as the positioning method.

The PCF and PSMF in the vehicular system relate to the location information measured and estimated in mobile structures such as a train service system and a car navigation system and are applied to the case in which the PM_6 is used as the positioning method.

The PSMF in the NB is applied to the cases in which the PM_1, PM_2_1, PM_2_2, PM_3, and PM_5 are used as the positioning method. The positioning method will be described below.

The location client functions 552 for the NB are the NB_uu/s1 and the RNC/SAS (positioning function for NB).

The LCF in the NB_uu/s1 is implemented for resetting and requesting again a location measurement, for example, when the NB is reset and when an NB that can change an installation location but is basically operated while being fixed detects a movement.

The LCF in the RNC/SAS (positioning function for NB) is implemented for issuing a location estimation request when, for example, a measurement is additionally necessary, based on the location estimation results.

As to the location client functions 552 for the UE, the RNC/SAS (positioning function for NB) is added to Table 6.2 of Non-Patent Document 1. This is implemented to activate UE location estimation for improving the accuracy in NB location estimation.

Next, the positioning method will be described. Table 4 shows seven positioning methods.

TABLE 4

| No. | Positioning Methods |
| --- | --- |
| PM_1 | Network-assisted GNSS method |
| PM_2_1 | OTDOA method |
| PM_2_2 | U-TDOA method |
| PM_3 | Cell ID method |
| PM_4 | Method based on UE tracking information |
| PM_5 | Method based on mobile eNB tracking information |
| PM_6 | Method based on assisted vehicular information |

The positioning methods are similar to those of the first embodiment described above, and E_PM_1, E_PM_2, E_PM_3, E_PM_4, E_PM_5, and E_PM_6 will be replaced with PM_1, PM_2_1 and PM_2_2, PM_3, PM_4, PM_5, and PM_6, respectively.

The PM_1 is a Network-assisted GNSS method. The PM_2_1 is an observed time difference of arrival (abbreviated as OTDOA) method. The PM_2_2 is an uplink time difference of arrival (abbreviated as U-TDOA) method. The PM_3 is a cell ID method. The PM_4 is a method based on the UE tracking information. The PM_5 is a method based on the mobile eNB tracking information. The PM_6 is a method based on the assisted vehicular information.

Specifically, the PM_1, PM_2_1, PM_2_2, and PM_3 function similarly to the UE location estimation described in Non-Patent Document 3, equip a target NB_uu/iub with the function of receiving, measuring, and calculating GNSS signals and the function of receiving, measuring, and calculating other NB downlink signals, and perform location estimation similarly to the UE operation.

Hereinafter, the eNB_uu/s1, eNB, MME/E-SMLC for UE, and MME/E-SMLC for eNB are replaced with the NB_uu/iub, NB, RNC/SAS for UE, and RNC/SAS for NB, respectively, thereby implementing functions similar to those of the first embodiment described above. This allows for UE location estimation using the location estimation of a movable NB and the estimation results thereof.

Third Embodiment

Next, a third embodiment of the present invention will be described. In the present embodiment, the information including the information regarding location estimation of a base station is exchanged between different radio access networks or radio access networks being served by different GMLCs, such as between the E-UTRAN and UTRAN, and then this information is used in the procedures of measuring the location of an (e)NB in the first and second embodiments described above, especially when a "first LUP request for estimating one location using plurality of pieces of information in terms of time" and a "second LUP request for continuously measuring a first LUP request, assuming the operation during moving" are estimated. As a result, an improvement in location estimation accuracy can be anticipated.

Figure 22:
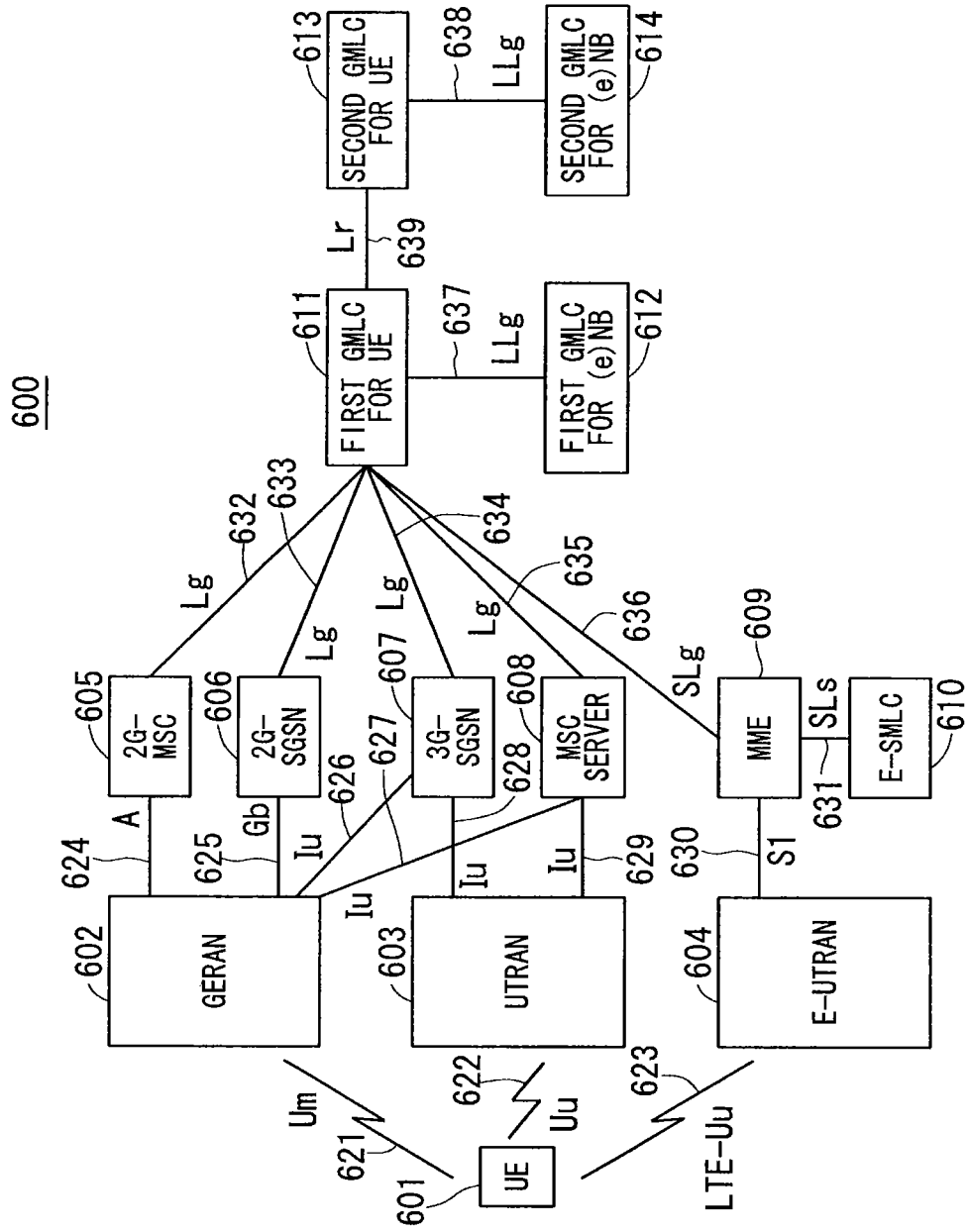
FIG. 22 is a block diagram showing a configuration of a mobile network system 600 in a third embodiment of the present invention.

FIG. 22 is a block diagram showing a configuration of a mobile network system 600 in the third embodiment of the present invention. Hereinafter, the eNB and NB may be collectively referred to as "(e)NB".

The radio communication system 600 includes a UE 601, GERAN 602, UTRAN 603, E-UTRAN 604, 2G-MSC 605, 2G-SGSN 606, 3G-SGSN 607, MSC server 608, MME 609, E-SMLC 610, first GMLC for UE 611, first GMLC for (e)NB 612, second GMLC for UE 613, and second GMLC for (e)NB 614.

The UE 601 and GERAN 602 are connected by a Um interface 621. The UE 601 and UTRAN 603 are connected by a Uu interface 622. The UE 601 and E-UTRAN 604 are connected by an LTE-Uu interface 623.

The GERAN 602 and 2G-MSC 605 are connected by an A interface 624. The GERAN 602 and 2G-SGSN 606 are connected by a Gb interface 625. The GERAN 602 and 3G-SGSN 607 are connected by an Iu interface 626. The GERAN 602 and MSC server 608 are connected by an Iu interface 627.

The UTRAN 603 and 3G-SGSN 607 are connected by an Iu interface 628. The UTRAN 603 and MSC server 608 are connected by an Iu interface 629.

The E-UTRAN 604 and MME 609 are connected by an S1 interface 630. The MME 609 and E-SMLC 610 are connected by an SLs interface 631.

The first GMLC for UE 611 and 2G-MSC 605 are connected by an Lg interface 632. The first GMLC for UE 611 and 2G-SGSN 606 are connected by an Lg interface 633. The first GMLC for UE 611 and 3G-SGSN 607 are connected by an Lg interface 634. The first GMLC for UE 611 and MSC server 608 are connected by an Lg interface 635. The first GMLC for UE 611 and MME 609 are connected by an SLg interface 636.

The first GMLC for UE 611 and first GMLC for (e)NB 612 are connected by an LLg interface 637. The second GMLC for UE 613 and second GMLC for (e)NB 614 are connected by an LLg interface 638. The first GMLC for UE 611 and second GMLC for UE 613 are connected by an Lr interface 639.

The GMLC for UE corresponds to a gateway mobile location centre (GMLC) described in Chapter 6.3.3 of Non-Patent Document 1. In the present embodiment, as shown in FIG. 22, GMLCs for (e)NB are provided so as to be connected to the GMLCs for UE.

The GMLC for (e)NB performs the process of transmitting the location information between radio access networks being served by the GMLC for UE and the process of transmitting the location information between radio access networks being served by other GMLC for UE.

FIG. 22 is a diagram showing a logical configuration and does not show a physical configuration. For example, FIG. 22 shows the first and second GMLCs for (e)NB 612 and 614 independently of the first and second GMLCs for UE 611 and 613, which does not mean that the first and second GMLCs for (e)NB 612 and 614 and the first and second GMLCs for UE 611 and 613 are devices physically independent.

Figure 23:
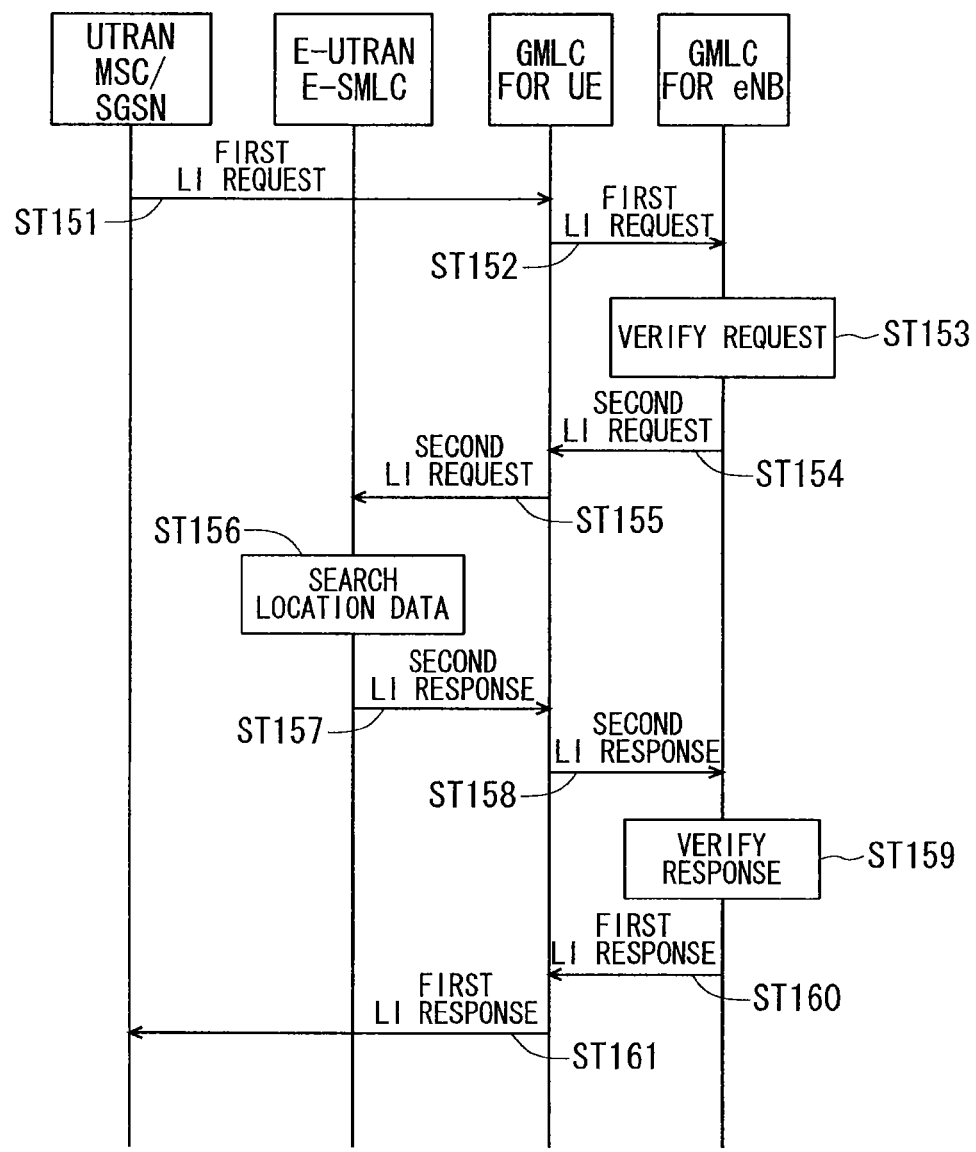
FIG. 23 is a diagram showing an exemplary sequence for a process of transmitting location information between radio access networks being served by a GMLC for UE.

FIG. 23 is a diagram showing an exemplary sequence regarding the process of transmitting the location information between radio access networks being served by the GMLC for UE. FIG. 23 shows a case in which the UTRAN requests the information regarding the location estimation in the E-UTRAN.

First, in a case where the MSC/SGSN of the UTRAN judges that the location information of the base station in other radio access network is necessary as a result of, for example, a base station of the own radio access network system detecting a base station of other radio access network, or a UE being in the service area of the own radio access network system reporting the in-area information of the other radio access network, in Step ST151, the MSC/ SGSN of the UTRAN transmits a first location information (abbreviated as LI) request message to the GMLC for UE.

In Step ST152, the GMLC for UE that has received the first LI request message transmits the first LI request message to the GMLC for (e)NB. In Step ST153, the GMLC for (e)NB that has received the first LI request verifies the validity of a request and a request sourse through, for example, message authentication and authentication of a request source.

When judging that there is no problem in verification of a request and the validity of a request source in Step ST153, in Step ST154, the GMLC for (e)NB transmits a second LI request message to the GMLC for UE. In Step ST155, the GMLC for UE that has received the second LI request transmits the second LI request message to the E-SMLC of the E-UTRAN.

The verification of a request and the validity of a request source in Step ST153 may be performed by the GMLC for UE, or the verification of a request and the verification of the validity of a request source may be performed separately.

In Step ST156, the E-SMLC of the E-UTRAN that has received the second LI request searches location data requested. In Step ST157, the E-SMLC of the E-UTRAN transmits a second LI response to the GMLC for UE.

In Step ST158, the GMLC for UE that has received the second LI response transmits the second LI response to the GMLC for eNB. In Step ST159, the GMLC for eNB that has received the second LI response verifies the second LI response and the validity of a response source.

When judging that there is no problem in verification of a response and the validity of a response source in Step ST159, in Step ST160, the GMLC for eNB transmits a first LI response message to the GMLC for UE. In Step ST161, the GMLC for UE that has received the first LI response message transmits the first LI response to the MSC/SGSN of the UTRAN.

In Step ST159, as in Step ST153, the verification of a response and the validity of a response source may be performed by the GMLC for UE, or the verification of a response and the verification of the validity of a response source may be performed separately.

FIG. 24 is a diagram showing an exemplary sequence regarding the process of transmitting the location information between radio access networks being served by different GMLCs for UE. FIG. 24 shows a case in which an E-UTRAN of a first network requests the information regarding the location estimation in an E-UTRAN of a second network.

First, in a case where the E-UTRAN E-SMLC of the first network judges that the location information of a base station of other radio access network is necessary as a result of, for example, a base station of the own radio access network system detecting a base station of other radio access network being served by other GMLC or a UE being in the service area of the own radio access network system reporting the in-area information of the other radio access network being served by the other GMLC, in Step ST171, the E-UTRAN E-SMLC of the first network transmits an inter GMLC first LI request message to the GMLC for UE of the first network.

In Step ST172, the GMLC for UE of the first network that has received the inter GMLC first LI request message transmits the inter GMLC first LI request message to the GMLC for eNB of the first network.

In Step ST173, the GMLC for eNB of the first network that has received the inter GMLC first LI request verifies the inter GMLC first LI request and the validity of a request source. When judging that there is no problem in verification of the inter GMLC first LI request and the validity of a request source in Step ST173, in Step ST174, the GMLC for eNB of the first network transmits the inter GMLC first LI request message to the GMLC for UE of the first network.

In Step ST175, the GMLC for UE of the first network that has received the inter GMLC first LI request transmits an inter GMLC second LI request message to a network being a request destination, specifically, the GMLC for UE of the second network.

The verification of a request and the validity of a request source in Step ST173 may be performed by the GMLC for UE of the first network, or the verification of a request and the verification of the validity of a request source may be performed separately.

In Step ST176, the GMLC for UE of the second network that has received the inter GMLC second LI request transmits an inter GMLC second LI request message to the GMLC for eNB of the second network.

In Step ST177, the GMLC for eNB of the second network that has received the inter GMLC second LI request verifies a request and the validity of a request source. When judging that there is no problem in verification of a request and the validity of a request source in Step ST177, in Step ST178, the GMLC for eNB of the second network transmits an inter GMLC third LI request message to the GMLC for UE in the second network.

In Step ST179, the GMLC for UE of the second network that has received the inter GMLC third LI request transmits the inter GMLC third LI request to the E-UTRAN E-SMLC of the second network being a request destination.

The verification of a request and the validity of a request source in Step ST177 may be performed by the GMLC for UE of the second network, or the verification of a request and the verification of the validity of a request source may be performed separately.

In Step ST180, the E-UTRAN E-SMLC of the second network that has received the inter GMLC third LI request message searches location data requested. In Step ST181, the E-UTRAN E-SMLC of the second network transmits an inter GMLC third LI response message to the GMLC for UE of the second network.

In Step ST182, the GMLC for UE of the second network that has received the inter GMLC third LI response transmits the inter GMLC third LI response message to the GMLC for eNB of the second network.

In Step ST183, the GMLC for eNB of the second network that has received the inter GMLC third LI response message verifies the inter GMLC third LI response and the validity of a response source. When judging that there is no problem in verification of the inter GMLC third LI response and the validity of a response source in Step ST183, in Step ST184, the GMLC for eNB of the second network transmits an inter GMLC second LI response message to the GMLC for UE of the second network.

In Step ST185, the GMLC for UE of the second network that has received the inter GMLC second LI response transmits the inter GMLC second LI response message to the GMLC for UE of the first network being a request source.

In Step ST183, as in Step ST177, the verification of a response and the validity of a response source may be performed by the GMLC for UE of the second network, or the verification of a response and the verification of the validity of a response source may be performed separately.

In Step ST186, the GMLC for UE of the first network that has received the inter GMLC second LI response message transmits the inter GMLC second LI response message to the GMLC for eNB of the first network.

In Step ST187, the GMLC for eNB of the first network that has received the inter GMLC second LI response verifies the inter GMLC second LI response and the validity of a response source. When judging that there is no problem in verification of the inter GMLC second LI response and the validity of a response source in Step ST187, in Step ST188, the GMLC for eNB of the first network transmits an inter GMLC first LI response message to the GMLC for UE of the first network.

In Step ST189, the GMLC for UE of the first network that has received the inter GMLC first LI response transmits the inter GMLC first LI response message to the E-UTRAN E-SMLC of the first network being a request source.

In Step ST187, as in Step ST173, the verification of a response and the validity of a response source may be performed by the GMLC for UE of the first network, or the verification of a response and the verification of the validity of a response source may be performed separately.

The configuration described above allows for location estimation using the information regarding location estimation of base stations of different radio access networks or radio access networks being served by different GMLCs. This results in an improvement in location estimation accuracy.

Fourth Embodiment

Next, a fourth embodiment of the present invention will be described. The present embodiment describes the location estimation by the method based on the UE tracking information of the E_PM4 and PM_4 among the positioning methods in the first and second embodiments described above. A case in which a HeNB as an (e)NB_s1 and three UEs are provided is considered as an example.

FIG. 25 is a diagram showing a positional relationship among a H(e)NB and UEs in a radio communication system 140. In FIG. 25, a H(e)NB 148 and its cell area (hereinafter, also referred to as a "cell area of the H(e)NB") 149 are installed in a place beyond radio waves from the GNSS and also beyond radio waves from other (e)NB. In other words, they are installed in an environment that cannot be supported by the positioning methods of (E_)PM_1 to (E_)PM_3, (E_)PM5, and (E_)PM_6 shown in Tables 2 and 4.

This HeNB broadcasts that the location estimation by the method based on the UE tracking information is activated upon the first LUP request in the first embodiment described above, and that itself is a cell by the method based on the UE tracking information in the system information.

Three UEs, namely first to third UEs 142 to 144, which had not been in the coverage of the HeNB, have obtained the information regarding location estimation at some point, and then have been in the coverage of the cell area 149 of this H(e)NB. In other words, the three UEs 142 to 144 have moved to the locations indicated by reference numerals 145 to 147, respectively. The three UEs 142 to 144 do not need to be in the coverage of the H(e)NB at the same time in terms of time.

At this time, each UE obtains the system information and is notified that the cell concerned is a cell by the method based on the UE tracking information. Then, each UE transmits the information regarding the location estimation obtained most recently, in the UE location information report. The information regarding the most recent location estimation may include the information on a plurality of points.

The past locations, specifically, the latitudes and longitudes can be estimated from the information regarding the location estimation of the three UEs, namely first to third UEs 142 to 144 via the HeNB.

The location estimation at this time is described with reference to FIG. 26. FIG. 26 is a diagram for describing the location estimation method. FIG. 26 shows, by reference numerals "151" to "153", the locations at which the first to third UEs 142 to 144 have obtained the information regarding location estimation, for example, the locations at which the first to third UEs 142 to 144 have received GPS signals transmitted from GPS satellites 141.

As shown in FIG. 26, a circumscribed circle 154 with vertices at the locations 151 to 153 when the first to third UEs 142 to 144 have received GPS signals is described, and a circumcenter 155 thereof is calculated, whereby the location at which the H(e)NB is installed can be estimated. The area indicated by reference numeral "150" is taken as the cell area of the H(e)NB installed in FIG. 25.

In a case where there are a plurality of pieces of latitude and longitude information notified from the UEs, for example, a location which has the smallest distance with respect to the measured location information of all the UEs can be estimated as a location at which the H(e)NB is installed.

In other words, when the latitude and longitude being the location information of the H(e)NB are represented by (X, Y) with the latitude and longitude as X and Y, respectively, the latitude and longitude being the measured location information of a UE0 are represented by (X0, Y0), the latitude and longitude being the measured location information of a UE1 are represented by (X1, Y1), . . . , and the latitude and longitude being the measured location information of the UEn−1 are represented by (Xn−1, Yn−1), the location at which the H(e)NB is installed can be estimated by obtaining a location (X, Y) with the smallest d shown in Expression (1) below.

[Math 1]

$$d = \sum_{i=0}^{n-1} \{(X - Xi)^2 + (Y - Yi)^2\} \quad (1)$$

This utilizes that at power-on, that is, with the power being turned on, the UE continuously moves on a geographical plane while intermittently continuing a measurement on at least the cell information. Thus, if the power of the UE is turned off on the way and then the power is turned on, so that the UE is first in the coverage of the H(e)NB, there is no continuity with the information before turning-off of the power.

As a counter measure against the above-mentioned case, if the UE transmits the location information in a UE location information report, TAU, or RAU, the information regarding whether or not a H(e)NB is the cell of which coverage the UE is in first after turning-on of the power is notified together. Alternatively, an invalid value is set as the measurement value.

The E-SMLC for eNB and the RNC/SAS, which have received the information indicating that a H(e)NB is the cell of which coverage the UE is in first after turning-on of the power, avoid eNB location estimation using the received UE location information, resulting in location estimation having a higher degree of accuracy.

The above-mentioned H(e)NB is an "eNB whose installation location is changeable but which is basically operated while being fixed", and in the method based on the UE tracking information, handles data of a plurality of mobile stations. Thus, if the information before moving of an eNB and the information after moving of an eNB are mixed, estimation becomes difficult. Therefore, the implementation of location estimation is simplified by providing a movement detection mechanism that detects a movement of the eNB. The reason why the implementation of location estimation can be simplified by providing a movement detection mechanism is that, as described in the first embodiment, re-measurement can be performed using the LCF of the eNB_uu/s1.

Here, as the mechanism in which the eNB detects a movement, for example, the connection between the s1 interface and a Uu interface on the network connection side is monitored and, if the connection is disconnected, it is judged that the UE has moved. When the power of the eNB is turned on or the eNB is reset, the mechanism judges that the UE has moved. Or, an acceleration sensor is installed and detects changes in acceleration. The movement can be detected through the above.

In the present embodiment, as described above, the base station location information is estimated based on a plurality of pieces of equipment location information that have been estimated by equipment location estimation unit in user equipments. As a result, the received base station location information can be estimated also in a case in which there is no external signal for identifying a location.

In the present embodiment, a base station being a location estimation target includes a movement detection mechanism. This allows for easier estimation of the base station location information.

Fifth Embodiment

Next, a fifth embodiment of the present invention will be described. As described in the fourth embodiment above, the past data of the UE is used in location estimation by the methods based on the UE tracking information of the E_PM4 and PM_4 among the positioning methods in the first and second embodiments. Thus, if the behavior from the UE measuring data to the UE being in a coverage of a target (e)NB can be estimated and corrected, an improvement in accuracy of (e)NB location estimation can be anticipated.

In the present embodiment, therefore, a measurement time and an estimation time of the data are added to the information regarding the location estimation transmitted from the UE, and then the information is transmitted.

The (e)NB that has received this data adds a reception time to the data or sets an elapsed time calculated from the reception time and measurement time, and then transmits the elapsed time to the E-SMLC for eNB or the RNC/SAS.

The E-SMLC for eNB or the RNC/SAS that has received the location information and the time information performs weighting of the received data by time information, and then estimates the (e)NB location. A specific example of the location estimation will be described below. The present embodiment assumes a case similar to the fourth embodiment described above.

The moving speed is typically unknown, but in consideration of that the H(e)NB is located in a building or underground where GPS signals and signals from a macro cell cannot be received, the moving speed can be regarded as a walking speed.

As described below, if a movement path is subjected to linear approximation, the moving speed may be about a half thereof. In the estimation of a movement path, a plurality of estimation values may be calculated by providing a plurality of moving speeds, and the estimation value may be selected in H(e)NB location estimation.

If usable, the moving speed information calculated in location estimation may be used. In the present embodiment, a speed of 1.5 km/h is assumed as a half of the walking speed, and 1.5 km/h×elapsed time (h) is calculated, to thereby estimate a travel distance.

Figure 27:
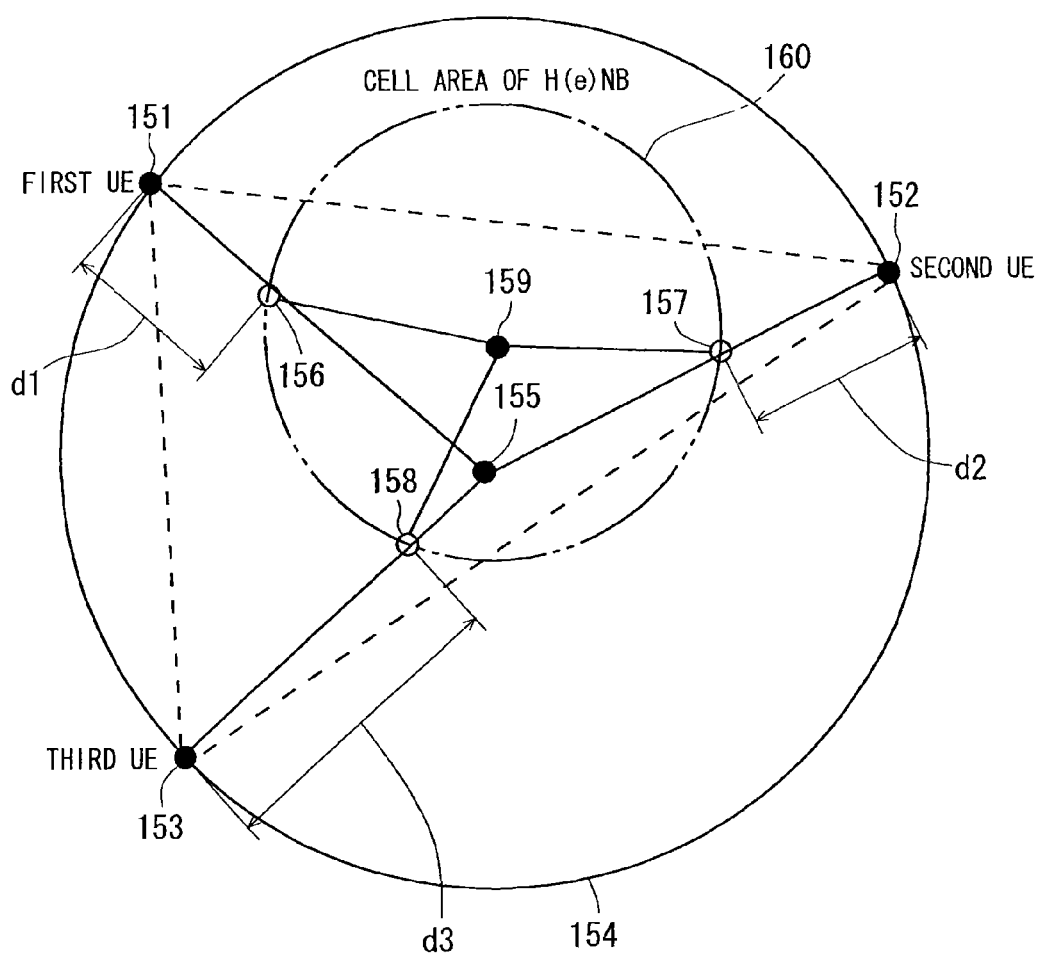
FIG. 27 is a diagram for describing a method of estimating a movement path after measurement.

FIG. 27 is a diagram for describing the method of estimating a movement path after measurement. In the present embodiment, as in the fourth embodiment described above, first, a H(e)NB location is estimated from the location information.

Then, its estimation location, which is a location indicated by reference numeral "155" in FIG. 27, and measurement points, which are points indicated by reference numerals "151", "152", and "153" in FIG. 27, are joined by straight lines. Then, locations moved by travel distances calculated in advance, which are d1 to d3 in FIG. 27 and indicated by reference numerals "156", "157", and "158" in FIG. 27, are estimated as the locations when UEs are in the coverage of the cell of the H(e)NB.

Then, a point located equidistant from those points, specifically, a circumcenter 159 of a polygon with the vertices at the estimation locations when the UEs are in the coverage of the cell of the H(e)NB is calculated. This allows for estimation of a location at which the H(e)NB is installed. An area indicated by reference numeral "160" is taken as a cell area of the H(e)NB installed in FIG. 25.

If there are a plurality of movement path estimation values, a plurality of locations may be estimated to estimate a suitable location using its results and the estimation results as described above in the first embodiment.

The cell radius of a cell of the H(e)NB, the received powers, path loss estimation values, and the like of the user equipment device and base station device are obtained, and the distance between the H(e)NB and user equipment device is estimated, so that the estimated value is used in estimation of the H(e)NB location. As a result, an improvement in accuracy of location estimation can be anticipated.

The movement path after measurement is estimated using the past measurement time, resulting in an improvement in accuracy of location estimation.

The embodiments of the present invention can be freely combined within the scope of the invention, and the elements of the embodiments can be appropriately modified or omitted.

While the invention has been shown and described in detail, the foregoing description is in all aspects illustrative and not restrictive. It is therefore understood that numerous modifications and variations can be devised without departing from the scope of the invention.

DESCRIPTION OF REFERENCE SYMBOLS

261 target UE, 262 SLP, 263 eNodeB, 264 E-SMC for UE, 265 first MME, 281 vehicular system, 282 target eNodeB_uu, 283 UE, 284 eNodeB, 285 target eNodeB_s1, 286 second MME, 287 E-SMLC for eNB.

The invention claimed is:

1. A radio communication system comprising:
   a movable user equipment device;
   a base station device configured to perform radio communication with said user equipment device; and
   a management device, wherein
   said base station device is movable,
   at least any one of said user equipment device, said base station device, and said management device includes a location estimation processing unit that performs a measurement and a calculation for estimating base station location information being information regarding a location of said base station device, to thereby estimate said base station location information,
   said management device is configured to perform at least one process of radio communication control in communication between said user equipment device and said base station device, control of a communication call, management of moving of said user equipment device, management of said radio communication system, and management of location information of the devices constituting said radio communication system, and
   said management device performs said process based on said base station location information estimated by said location estimation processing unit,
   said management device manages said base station devices through classification into any of two types of (a) a fixed base station device that is installed in a fixed manner and is operated while being fixed, and (b) a movable base station device that is movably installed and is operated while being fixed, and
   said location estimation processing unit estimates said base station location information based on the classification by said management device.

2. The radio communication system according to claim 1, comprising a plurality of said management devices,
   wherein each of said management devices is configured to transmit and receive, to and from other management device, said base station location information estimated by said location estimation processing unit, and performs said process based on said base station location information received from the other management device.

3. The radio communication system according to claim 1, wherein
   at least any one of said user equipment device, said base station device, and said management device includes an equipment location estimation unit that estimates equipment location information being information regarding a location of said user equipment device, and
   said equipment location estimation unit estimates said equipment location information based on said base station location information estimated by said location estimation processing unit.

4. The radio communication system according to claim 1, wherein
   at least any one of said user equipment device, said base station device, and said management device includes an equipment location estimation unit that estimates equipment location information being information regarding a location of said user equipment device, and
   said location estimation processing unit estimates said base station location information based on a plurality of pieces of said equipment location information estimated by said equipment location estimation unit.

5. The radio communication system according to claim 4, wherein upon said user equipment device starting communication with a base station device having said base station location information that is to be estimated, said equipment location estimation unit transmits said equipment location information of said user equipment device to said location estimation processing unit.

6. The radio communication system according to claim 1, wherein
   at least any one of said user equipment device, said base station device, and said management device includes an equipment location estimation unit that estimates equipment location information being information regarding a location of said user equipment device, and
   said location estimation processing unit estimates said base station location information based on a plurality of pieces of said equipment location information estimated by said equipment location estimation unit and a plurality of pieces of time information regarding times when said pieces of equipment location information have been respectively estimated.

7. The radio communication system according to claim 6, wherein upon said user equipment device starting communication with a base station device having said base station location information that is to be estimated, said equipment location estimation unit transmits said equipment location information of said user equipment device to said location estimation processing unit.

8. The radio communication system according to claim 1, wherein
   said base station device includes said location estimation processing unit, and
   said location estimation processing unit continuously or intermittently performs said measurement on the own base station device, to thereby estimate said base station location information based on measurement results thereof.

9. The radio communication system according to claim 1, wherein
   said base station device is installed in a mobile structure being a movable structure to be movable together with said mobile structure, and
   said location estimation processing unit obtains mobile structure location information regarding a location of said mobile structure from said mobile structure or a mobile structure management system that manages said mobile structure, to thereby estimate said base station location information based on said mobile structure location information obtained.

10. The radio communication system according to claim 1, wherein
    said management device manages said base station devices through classification into any of three types of (a) the fixed base station device that is installed in the fixed manner and is operated while being fixed, (b) the movable base station device that is movably installed and is operated while being fixed, and (c) a mobile base station device that is movably installed and is operated while moving.

11. The radio communication system according to claim 1, wherein:
    said user equipment device includes the location estimation processing unit that performs the measurement and the calculation for estimating base station location information, being information regarding a location of said base station device, to thereby estimate said base station location information.

12. The radio communication system according to claim 1, wherein:
said management device is configured to perform radio communication control in communication between said user equipment device and said base station device, and said management device is also configured to perform control of the communication call.

13. A user equipment device included in a radio communication system comprising a movable user equipment device, a base station device configured to perform radio communication with said user equipment device, and a management device, said radio communication system being a radio communication system in which said management device is configured to perform at least one process of radio communication control in communication between said user equipment device and said base station device, control of a communication call, management of moving of said user equipment device, management of said radio communication system, and management of location information of the devices constituting said radio communication system, and said management device performs said process based on base station location information, being information regarding a location of said base station device, estimated by a location estimation processing unit that performs a measurement and a calculation for estimating said base station location information, wherein:
said management device manages said base station devices through classification into any of two types of (a) a fixed base station device that is installed in a fixed manner and is operated while being fixed, and (b) a movable base station device that is movably installed and is operated while being fixed,
said user equipment device comprises said location estimation processing unit,
said location estimation processing unit estimates said base station location information based on the classification by said management device, and
said user equipment device provides said management device or said base station device with information obtained by said location estimation processing unit.

14. A base station device included in a radio communication system comprising a movable user equipment device, a base station device configured to perform radio communication with said user equipment device, and a management device, said radio communication system being a radio communication system in which said management device is configured to perform at least one process of radio communication control in communication between said user equipment device and said base station device, control of a communication call, management of moving of said user equipment device, management of said radio communication system, and management of location information of the devices constituting said radio communication system, and said management device performs said process based on base station location information, being information regarding a location of said base station device, estimated by location estimation processing unit that performs a measurement and a calculation for estimating said base station location information, to thereby estimate said base station location information, wherein
said base station device is movably installed,
said location estimation processing unit,
said base station device provides said management device with said base station location information estimated by said location estimation processing unit
said management device manages said base station devices through classification into any of two types of (a) a fixed base station device that is installed in a fixed manner and is operated while being fixed, and (b) a movable base station device that is movably installed and is operated while being fixed, and
said location estimation processing unit estimates said base station location information based on the classification by said management device.

15. A management device included in a radio communication system comprising a movable user equipment device, a base station device configured to perform radio communication with said user equipment device, and a management device, said management device comprising a location estimation processing unit that performs a calculation for estimating base station location information being information regarding a location of said base station device, to thereby estimate said base station location information,
wherein said management device is configured to perform at least one process of radio communication control in communication between said user equipment device and said base station device, control of a communication call, management of moving of said user equipment device, management of said radio communication system, and management of location information of the devices constituting said radio communication system, and performs said process based on said base station location information estimated by said location estimation processing unit,
said management device manages said base station devices through classification into any of two types of (a) a fixed base station device that is installed in a fixed manner and is operated while being fixed, and (b) a movable base station device that is movably installed and is operated while being fixed, and
said location estimation processing unit estimates said base station location information based on the classification by said management device.

* * * * *